(12) United States Patent
Kusano et al.

(10) Patent No.: US 6,729,698 B2
(45) Date of Patent: May 4, 2004

(54) HYDRAULIC BRAKE DEVICE FOR VEHICLE

(75) Inventors: Akihito Kusano, Toyota (JP); Satoshi Ishida, Chiryu (JP); Tetsuya Kuno, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 18 days.

(21) Appl. No.: 10/279,871

(22) Filed: Oct. 25, 2002

(65) Prior Publication Data

US 2003/0090149 A1 May 15, 2003

(30) Foreign Application Priority Data

Oct. 26, 2001 (JP) ........................................ 2001-328979

(51) Int. Cl.7 ............................................... B60T 13/12
(52) U.S. Cl. ......................... 303/191; 303/87; 188/352
(58) Field of Search ............................. 303/191, 113.1, 303/87, 121, 122.04, 122.13; 188/352

(56) References Cited

U.S. PATENT DOCUMENTS 6,249,736 B1 * 6/2001 Schmidt et al. ............... 701/70

FOREIGN PATENT DOCUMENTS

JP 3-45456 A 2/1991

* cited by examiner

Primary Examiner—Matthew C. Graham
(74) Attorney, Agent, or Firm—Burns, Doane, Swecker & Mathis, L.L.P.

(57) ABSTRACT

A hydraulic brake device for applying a braking force to a wheel of a vehicle which can detect an air-containing in a hydraulic circuit. The hydraulic brake device includes a hydraulic pressure generating device for generating and outputting a hydraulic pressure in accordance with a brake operational amount, a wheel cylinder operated by the hydraulic pressure directly or indirectly supplied from the hydraulic pressure generating device for applying a braking force to a vehicle wheel, a brake operational amount detection device for detecting the brake operational amount, a pressure sensor for detecting an output hydraulic pressure outputted from the hydraulic pressure generating device, and a controller for detecting an air-containing in a hydraulic circuit by a response time relating to a rise of the output hydraulic pressure detected by the pressure sensor relative to a start of a rise of the brake operation amount detected by the brake operational amount detection device.

22 Claims, 9 Drawing Sheets

HYDRAULIC BRAKE DEVICE FOR VEHICLE

This application is based on and claims priority under 35 U.S.C. § 119 with respect to Japanese Patent Application filed on Oct. 26, 2001, the entire content of which is incorporated herein by reference.

FILED OF THE INVENTION

The present invention relates to a hydraulic brake device for a vehicle. More particularly, the present invention pertains to a hydraulic brake device for a vehicle which detects whether air is included in a hydraulic circuit.

BACKGROUND OF THE INVENTION

Known hydraulic brake devices for a vehicle for providing the controlling force to vehicle wheels by supplying the hydraulic pressure in the hydraulic circuit to each wheel cylinder by generating the hydraulic pressure in the hydraulic circuit in accordance with the operational force of a brake pedal have been disclosed.

The foregoing known hydraulic brake devices include drawbacks that the operational feeling of the brake pedal is deteriorated when the air is included in the hydraulic circuit and that the sufficient braking force cannot be obtained even when performing the strong brake pedal operation when a full braking is required. In this case, a driver can notice that the air is included in the hydraulic circuit by a deterioration of the operational feeling of the brake pedal. Notwithstanding, in order to securely inform the driver of the air-containing in the hydraulic circuit with the hydraulic brake device for the vehicle, it is preferable to provide an air-containing detection means for detecting that the air is included in the hydraulic circuit and for alarming the driver.

The known hydraulic brake device disclosed in Japanese Patent Laid-Open Publication No. H03-45456 includes an auxiliary hydraulic source for generating and outputting a predetermined high pressure irrespective of a brake operation, a pressure regulator for regulating the hydraulic pressure supplied from the auxiliary hydraulic source in accordance with the brake operational amount to be outputted. With the known hydraulic brake device disclosed in the Japanese Patent Laid-Open Publication No. H03-45456, the braking force is provided to the vehicle wheels by supplying the hydraulic pressure supplied from the pressure regulator to each wheel cylinder.

With the known hydraulic brake device disclosed in the Japanese Patent Laid-Open Publication No. H03-45456, the brake pedal operational force is not directly affected by the hydraulic pressure in the hydraulic circuit. Thus, when the air is included in the hydraulic circuit, the operational feeling of the brake pedal does not decline and the driver does not have a chance to notice that the air is included in the hydraulic circuit. Accordingly, it is desired provide the air-containing detection means for detecting the air included in the hydraulic circuit and for alarming the driver when the air is included in the hydraulic circuit according to the type of the known hydraulic brake device disclosed in Japanese Patent Laid-Open Publication No. H03-45456.

A need thus exists for a hydraulic brake device for a vehicle providing braking force to wheels of the vehicle, which detects whether air is included in a hydraulic circuit thereof.

SUMMARY OF THE INVENTION

In light of the foregoing, the present invention provides a hydraulic brake device which includes a hydraulic pressure generating device for generating and outputting a hydraulic pressure in accordance with a brake operational amount, a wheel cylinder operated by the hydraulic pressure directly or indirectly supplied from the hydraulic pressure generating device for applying a braking force to a vehicle wheel, a brake operational amount detection means for detecting the brake operational amount, an output hydraulic pressure detection means for detecting an output hydraulic pressure outputted from the hydraulic pressure generating device, a hydraulic circuit for supplying the hydraulic pressure to the wheel cylinder, and an air-containing detection means for detecting air included in the hydraulic circuit by a response time relating to a rise of the output hydraulic pressure detected by the output hydraulic pressure detection means relative to a start of a rise of the brake operation amount detected by the brake operational amount detection means.

According to another aspect of the present invention, a hydraulic pressure device includes an accumulator for accumulating a hydraulic pressure, an auxiliary hydraulic source, the auxiliary hydraulic source having a hydraulic pump for supplying the hydraulic pressure to the accumulator and generating and outputting a high pressure within a predetermined range irrespective of a braking operation by intermittently actuating the hydraulic pump, a regulator for regulating the hydraulic pressure supplied from the auxiliary hydraulic source to output a regulated hydraulic pressure in accordance with a brake operational amount, a wheel cylinder operated by the hydraulic pressure directly or indirectly supplied from the regulator for applying a braking force to a wheel of a vehicle, an auxiliary hydraulic pressure detection means for detecting an auxiliary hydraulic pressure outputted from the auxiliary hydraulic source, an output hydraulic pressure detection means for detecting an output hydraulic pressure outputted from the regulator, a hydraulic circuit for supplying the hydraulic pressure to the wheel cylinder, and an air-containing detection means for detecting air included in the hydraulic circuit by a declining amount of the auxiliary hydraulic pressure detected by the auxiliary hydraulic pressure detection means relative to an increment of the output hydraulic pressure detected by the output hydraulic pressure detection means.

According to still another aspect of the present invention, a hydraulic brake device includes an accumulator for accumulating a hydraulic pressure, an auxiliary hydraulic source having a hydraulic pump for supplying the hydraulic pressure to the accumulator for generating and outputting a high pressure within a predetermined range irrespective of a braking operation by intermittently actuating the hydraulic pump, a regulator for regulating the hydraulic pressure supplied from the auxiliary hydraulic source in accordance with a brake operational amount to output a regulated hydraulic pressure, a wheel cylinder operated by the hydraulic pressure directly or indirectly supplied from the regulator to apply a braking force to a wheel of a vehicle, a brake operational amount detection means for detecting the braking operational amount, an auxiliary hydraulic pressure detection means for detecting an auxiliary hydraulic pressure outputted from the auxiliary hydraulic source, a hydraulic circuit for supplying the hydraulic pressure to the wheel cylinder, and an air-containing detection means for detecting air included in the hydraulic circuit by a declining amount of the auxiliary hydraulic pressure detected by the auxiliary hydraulic pressure detection means relative to an increment of the braking operational amount detected by the braking operational amount detection means under a non operation state of the hydraulic pump.

According to further aspect of the present invention, a hydraulic brake device includes an automatic hydraulic pressure generating device having an auxiliary hydraulic source for outputting a predetermined high pressure irrespective of a braking operation for regulating a hydraulic pressure supplied from the auxiliary hydraulic source irrespective of the braking operation to output a regulated hydraulic pressure, a wheel cylinder operated by the hydraulic pressure directly or indirectly supplied from the automatic hydraulic pressure generating device for applying a braking force to a wheel of a vehicle, an output hydraulic pressure detection means for detecting an output hydraulic pressure outputted from the automatic hydraulic pressure generating device, a hydraulic circuit for supplying the hydraulic pressure to the wheel cylinder, and an air-containing detection means for detecting air included in the hydraulic circuit by a response time relating to a rise of the output hydraulic pressure detected by the output hydraulic pressure detection means relative to a start of an operation of the automatic hydraulic pressure generating device.

According to still further aspect of the present invention, a hydraulic brake device includes an automatic hydraulic pressure generating device having an auxiliary hydraulic source for outputting a predetermined high pressure irrespective of a braking operation for regulating a hydraulic pressure supplied from the auxiliary hydraulic source irrespective of the braking operation to output a regulated hydraulic pressure, a wheel cylinder operated by the hydraulic pressure directly or indirectly supplied from the automatic hydraulic pressure generating device for applying a braking force to a wheel of a vehicle, an output hydraulic pressure detection means for detecting an output hydraulic pressure outputted from the automatic hydraulic pressure generating device, a hydraulic circuit for supplying the hydraulic pressure to the wheel cylinder, and an air-containing detection means for detecting air included in the hydraulic circuit by an increment of the output hydraulic pressure detected by the output hydraulic pressure detection means after elapsing a predetermined time from starting an operation of the automatic hydraulic pressure generating device.

According to still further aspect of the present invention, a hydraulic brake device includes an automatic hydraulic pressure generating device, the automatic hydraulic pressure generating device having an accumulator for accumulating a hydraulic pressure, a hydraulic pump for supplying a hydraulic pressure to the accumulator, and an auxiliary hydraulic source for generating and outputting a high pressure within a predetermined range irrespective of a braking operation by intermittently actuating the hydraulic pump for regulating the hydraulic pressure supplied from the auxiliary hydraulic source irrespective of the braking operation to output a regulated hydraulic pressure. The hydraulic brake device further includes a wheel cylinder operated by the hydraulic pressure directly or indirectly supplied from the automatic hydraulic pressure generating device for applying a braking force to a wheel of a vehicle, an auxiliary hydraulic pressure detection means for detecting an auxiliary hydraulic pressure outputted from the auxiliary hydraulic source, an outputted hydraulic pressure detection means for detecting an output hydraulic pressure outputted from the automatic hydraulic pressure generating device, a hydraulic circuit for supplying the hydraulic pressure to the wheel cylinder, and an air-containing detection means for detecting air included in the hydraulic circuit by a declining of the auxiliary hydraulic pressure detected by the auxiliary hydraulic pressure detection means relative to an increment of the output hydraulic pressure detected by the output hydraulic pressure detection means after starting an operation of the automatic hydraulic pressure generating device under a non-operation state of the hydraulic pump.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

Figure 2:
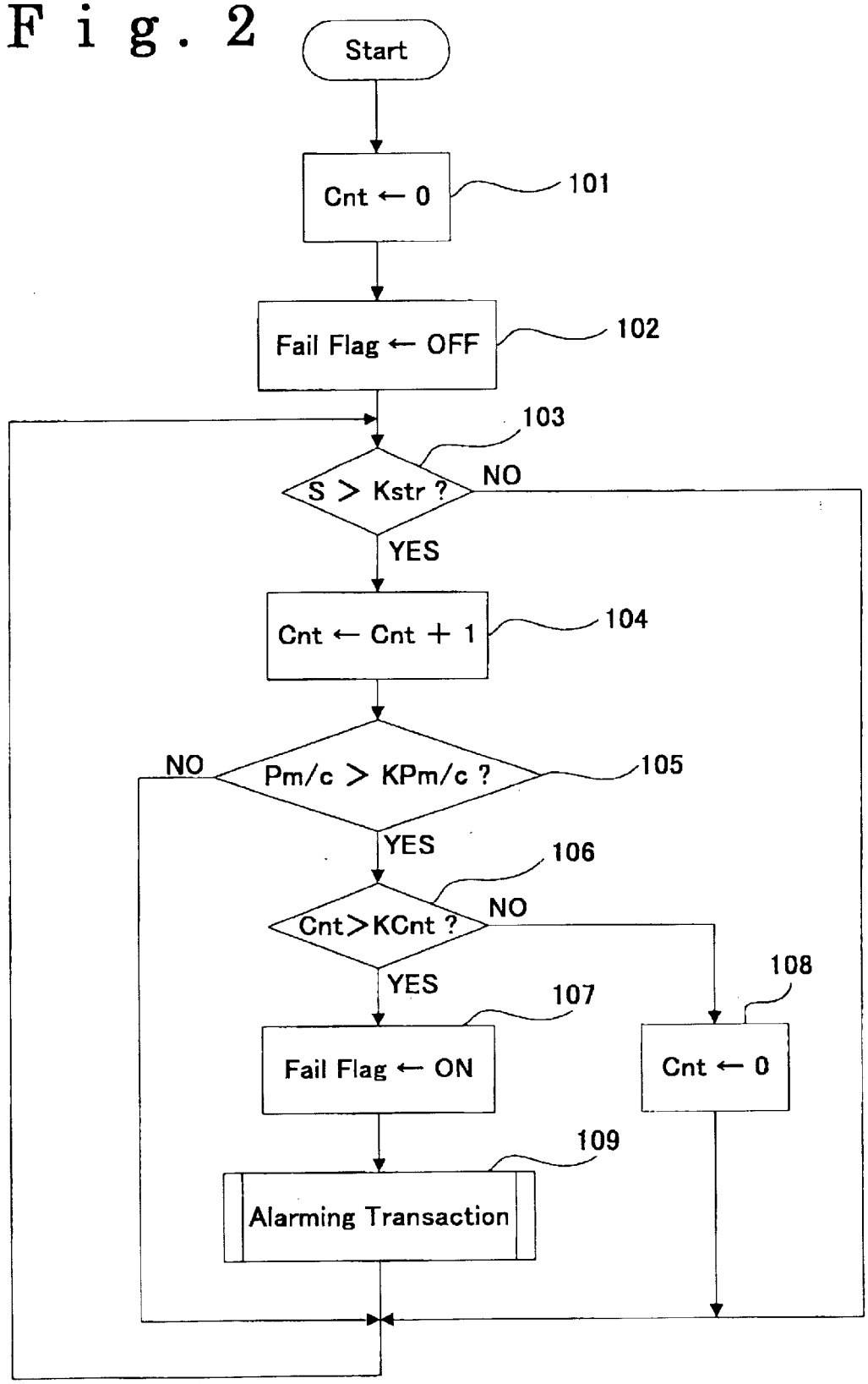
FIG. 2 is a flowchart of a first control method performed by a controller functioning as an air-containing detection means according to a first embodiment of the present invention.
Figure 6:
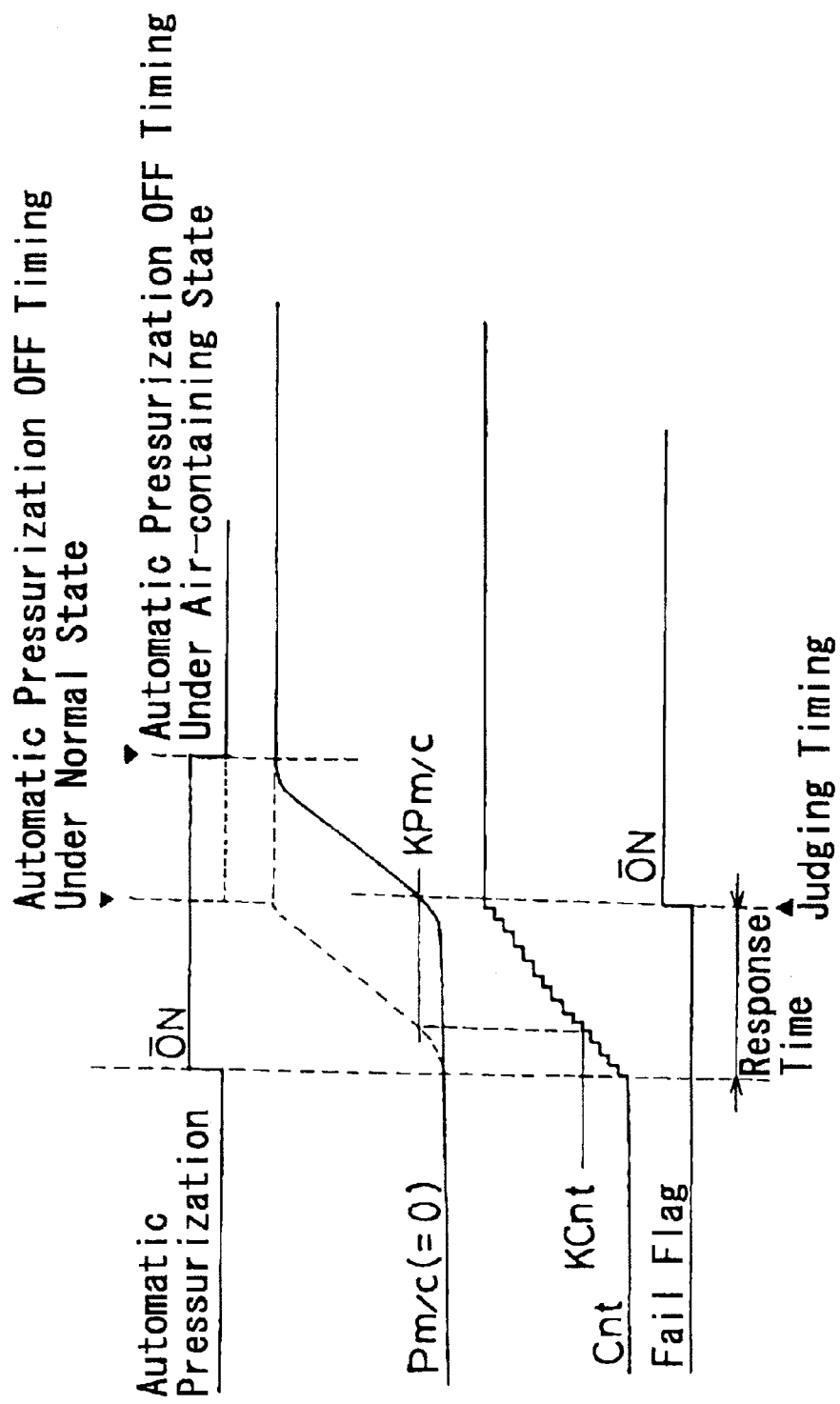

FIG. 6 a timing chart for each physical quantity when performing a variation of the first control method according to FIG. 2 of the present invention.

Figure 3A:
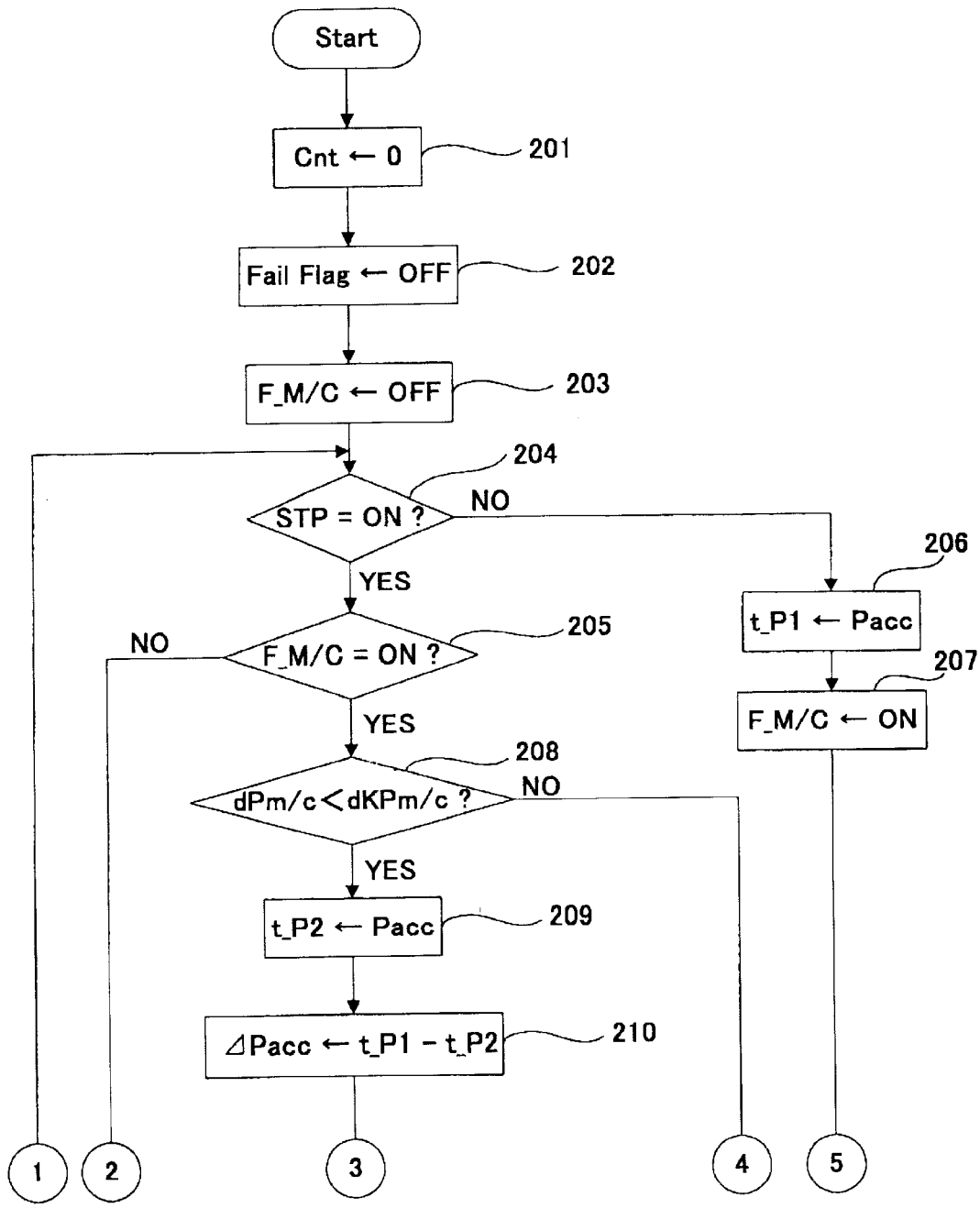
FIG. 3a is a flowchart of a second control method performed by the controller functioning as the air-containing detection means according to the second embodiment of the present invention.
Figure 3B:
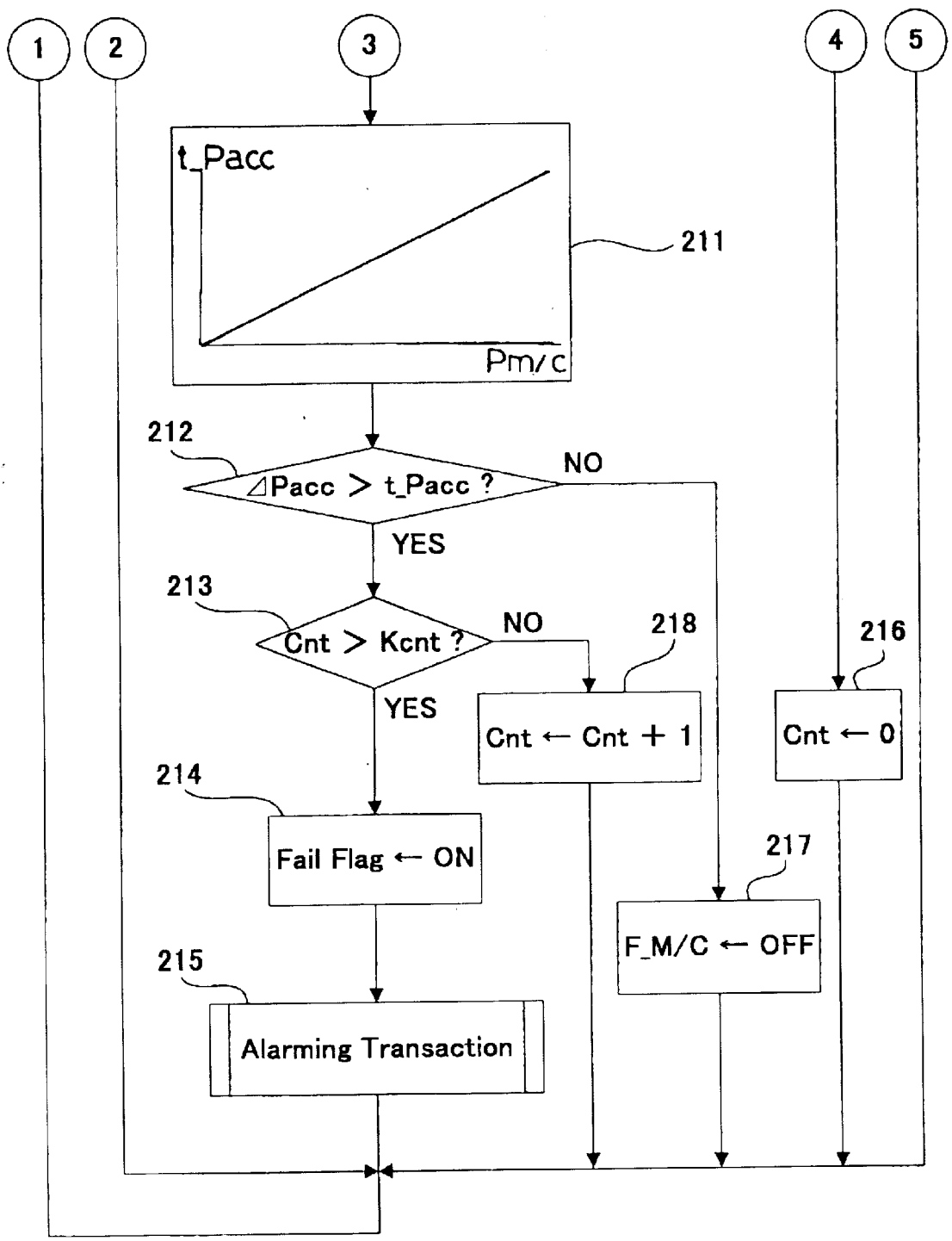
FIG. 3b is the flowchart of the second control method performed by the controller functioning as the air-containing detection means according to the second embodiment of the present invention.
Figure 7:
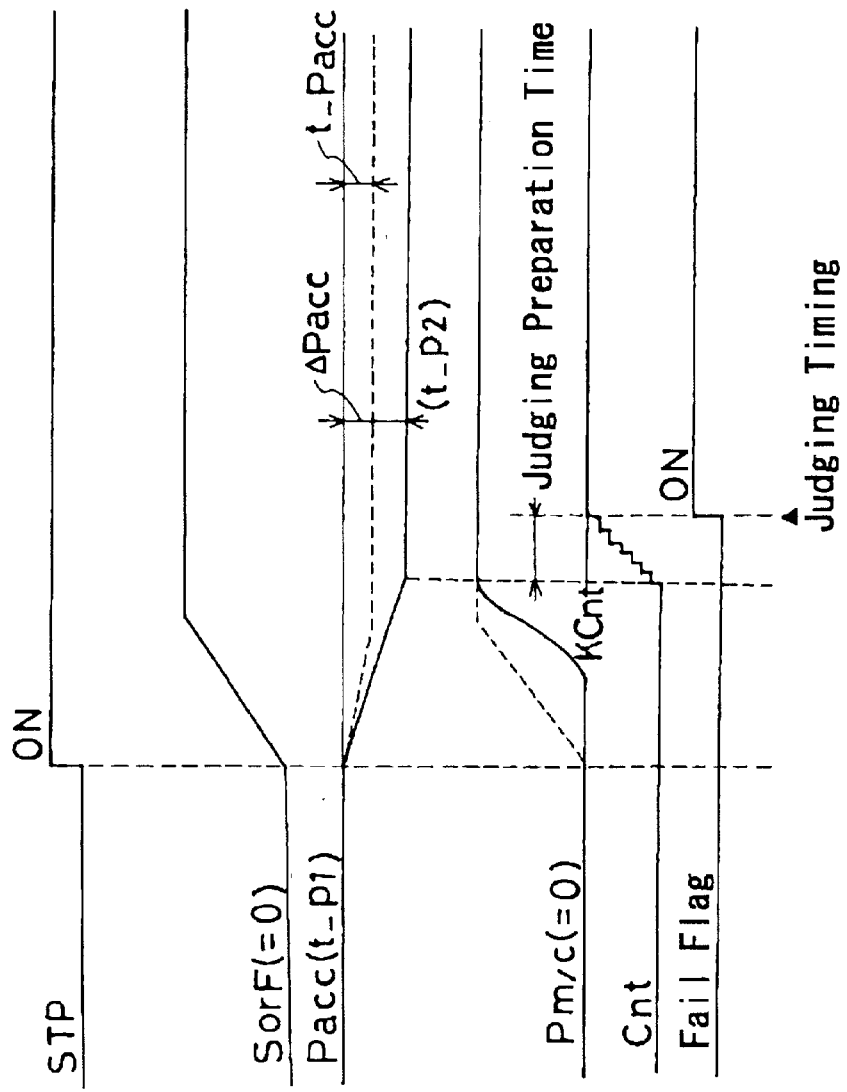

FIG. 7 is a timing chart for each physical quantity when performing the second control method according to FIGS. 3a, 3b of the present invention.

Figure 4:
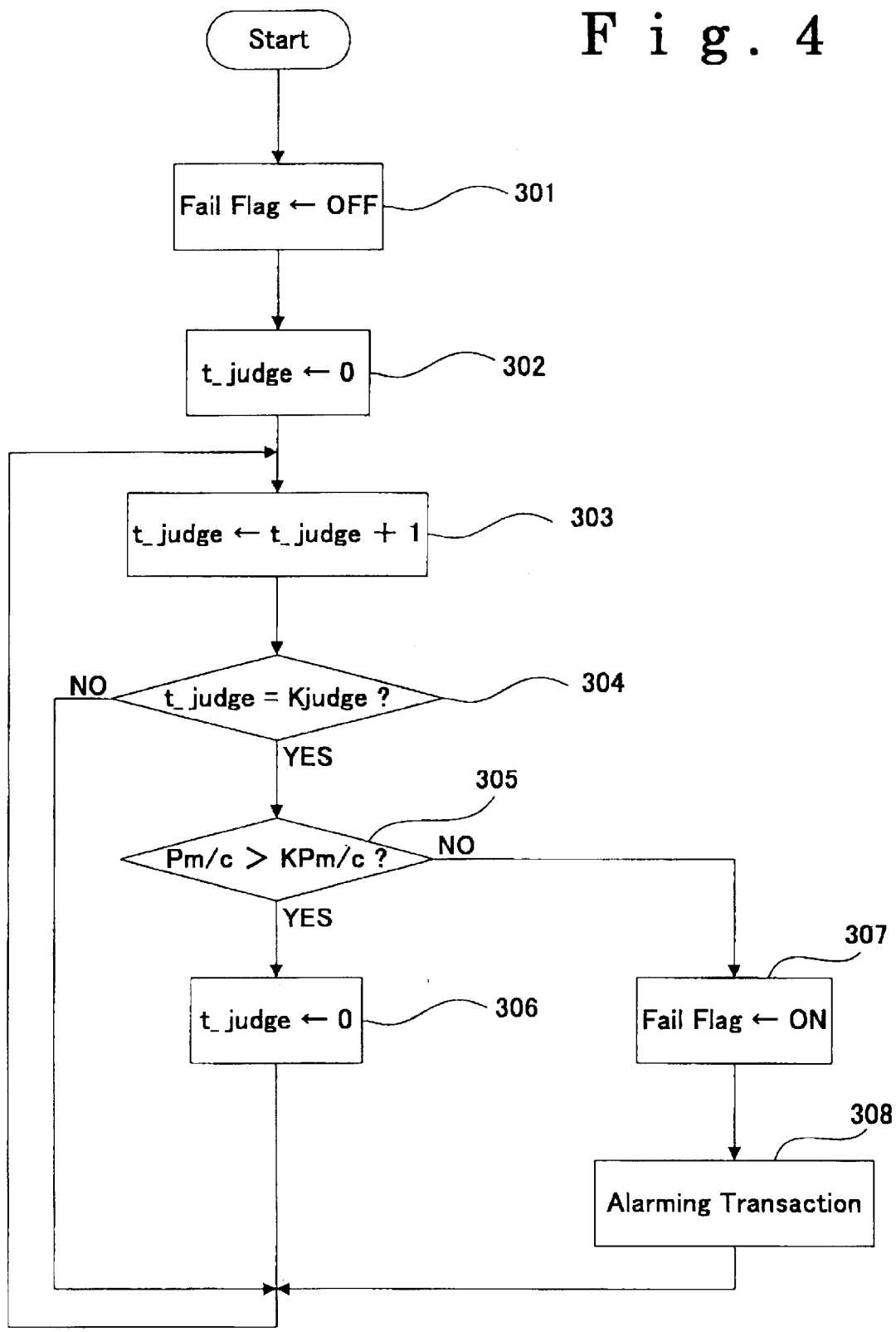
FIG. 4 is a flowchart of a third control method performed by the controller functioning as the air-containing detection means according to a third embodiment of the present invention.
Figure 8:
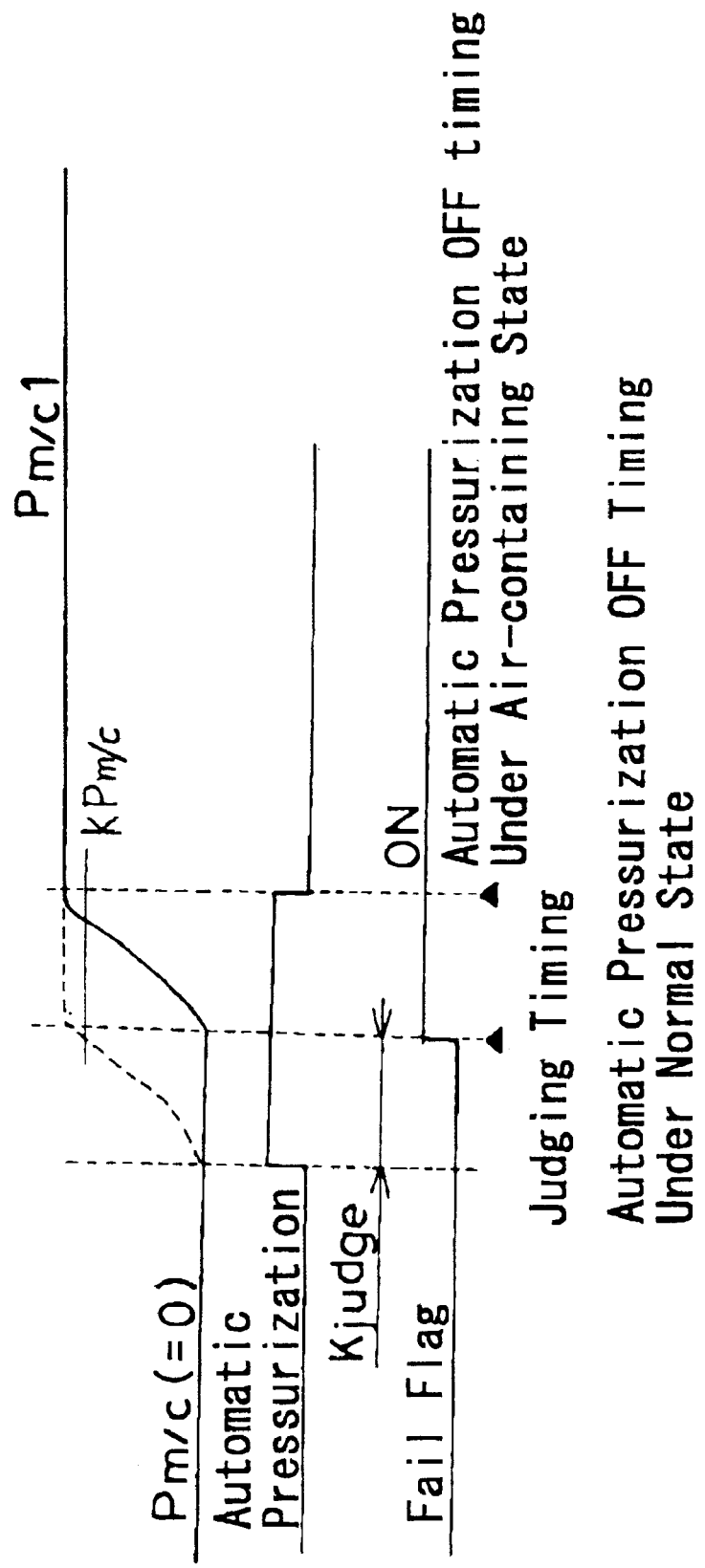

FIG. 8 is a timing chart for each physical quantity when performing the third control method according to FIG. 4 of the present invention.

DETAILED DESCRIPTION OF THE INVENTION

Figure 1:
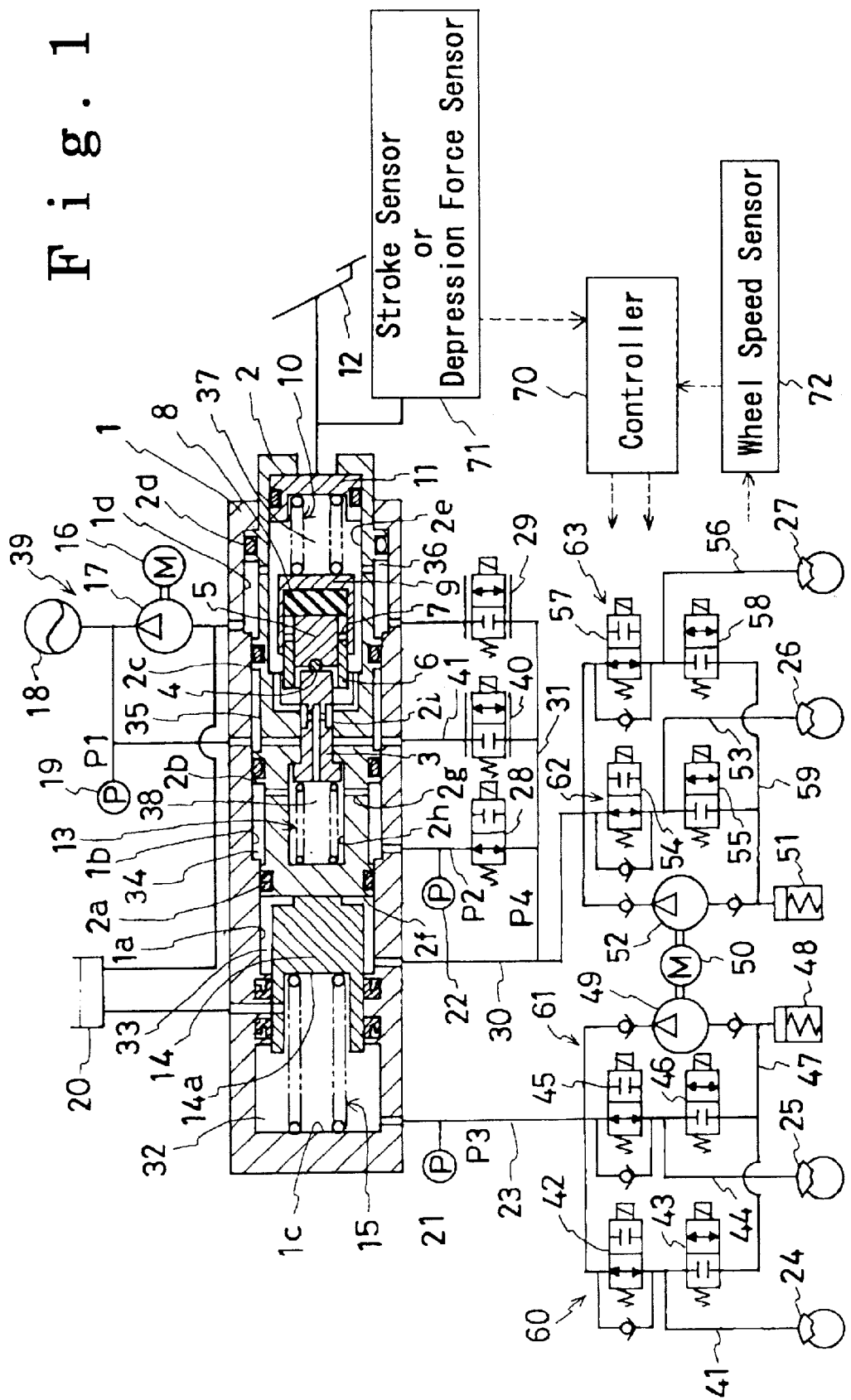
FIG. 1 is a functional view showing a construction of a hydraulic brake device for a vehicle under brake non-operational condition according to embodiments of the present invention.

Embodiments of a hydraulic brake device for a vehicle will be explained with reference to the illustrations in the drawing figures. Referring to FIG. 1, a mechanical construction of the hydraulic brake device for the vehicle according to embodiments of the present invention will be explained.

As shown in FIG. 1, the hydraulic brake device for the vehicle according to the embodiments of the present invention includes a cylinder 1 with a bottom having plural stepped bores, a master piston 14, and an auxiliary piston 2. The master piston 14 and the auxiliary piston 2 are inserted into the cylinder 1 in this order to be fluid tightly slidable one another. A pressure chamber 32 is defined between a bottom surface 1c of the cylinder 1 and a front side surface of the master piston 14. A hydraulic pressure P3 generated in the pressure chamber 32 is supplied to wheel cylinders 24, 25 via a hydraulic passage 23 and anti-lock brake devices 60, 61 respectively. The braking force in accordance with the hydraulic pressure after processing the control by the anti-lock brake devices 60, 61 can be applied to each wheel.

Thus, a master cylinder is constructed with the master piston 14 and the cylinder 1. An auxiliary pressure chamber 33 is defined between a rear side surface of the master piston 14 and a frond end surface 2f of the auxiliary piston 2. A hydraulic pressure P4 generated in the auxiliary pressure chamber 33 is supplied to wheel cylinders 26, 27 via a hydraulic passage 30 and anti-lock brake devices 62, 63. The braking force in accordance with the hydraulic pressure after processing the control by the anti-lock brake devices 62, 63 is applied to each wheel.

The anti-lock brake device 60 includes a normal open type solenoid valve 42 connected to the hydraulic passage 23 on an upstream side and connected to a hydraulic passage 41 which is connected to the wheel cylinder 24 on a downstream side, a normal closed type solenoid valve 43 connected to the hydraulic passage 41 on the upstream side and connected to a hydraulic passage 47 on the downstream side, a reservoir 48 connected to the hydraulic passage 47, a recirculation hydraulic pump 49 for recirculating the fluid pumped up from the reservoir 48 to the hydraulic passage 23, a motor 50 for actuating the recirculation hydraulic pump 49, and a controller 70 for controlling the motor 50, the normal open type solenoid valve 42, and the normal closed type solenoid valve 43. The anti-lock brake device 60 depressurizes the hydraulic pressure P3 in the hydraulic passage 23 to an optimum hydraulic pressure to apply the depressurized hydraulic pressure to the wheel cylinder 24 by controlling the motor 50, the normal open type solenoid valve 42, and the normal closed type solenoid valve 43 by the controller 70 based on inputs from various sensors. Because details of the controlling directional contents and operation of each components regarding the controller 70 are widely known, the explanations is not repeated here for simplifying the description.

The anti-lock brake device 61 includes a normal open type solenoid valve 45, a normal closed type solenoid valve 46, the reservoir 48, the recirculation hydraulic pump 49, the motor 50, and the controller 70. The anti-lock brake device 62 includes a normal open type solenoid valve 54, a normal closed type solenoid valve 55, a reservoir 51, a recirculation hydraulic pump 52, the motor 50, and the controller 70. The anti-lock brake device 63 includes a normal open type solenoid valve 57, a normal closed type solenoid valve 58, the reservoir 51, the recirculation hydraulic pump 52, the motor 50, and the controller 70. Because the construction and the operation of the anti-lock brake devices 61, 62, 63 are the same with the construction and the operation of the anti-lock brake device 60, detailed explanation is not repeated. A wheel speed of each wheel can be detected by a wheel speed sensor 72 serving as a vehicle stopped state judging means. An output signal from the wheel sensor 72 is supplied to the controller 70.

The auxiliary piston 2 includes three stepped portions on a sliding surface relative to the cylinder 1 formed on the external periphery thereof. A small diameter piston portion 2a, large diameter piston portions 2b, 2c, and a maximum diameter piston portion 2d are coaxially provided on the auxiliary piston 2. The small diameter piston portion 2a, the large diameter piston portions 2b, 2c, and the maximum diameter piston portion 2d are fluid tightly slidable with a small diameter portion 1a, a large diameter portion 1b, and a maximum diameter portion 1d, which form stepped bores of the cylinder 1, respectively.

A high pressure chamber 35 is formed as a space defined between the large diameter portion 1b of the cylinder 1, large diameter portions 2b, 2c of the auxiliary piston 2, and a non slidable external peripheral surface of the auxiliary piston 2.

The high pressure chamber 35 is supplied with a predetermined high pressure P1 from an auxiliary pressure source 39 serving as an auxiliary pressure source. A low pressure chamber 36 is formed as a space defined between the large diameter portion 1b of the cylinder 1, the maximum diameter portion 1d of the cylinder 1, the large diameter piston portion 2c of the auxiliary piston 2, the maximum diameter piston portion 2d of the auxiliary piston 2, and a non slidable external peripheral surface of the auxiliary piton 2. The low pressure chamber 36 is always in communication with a reservoir 20, thus the hydraulic pressure in the low pressure chamber 36 maintains the atmospheric pressure.

A hydraulic pressure chamber 34 is formed as a space defined with the small diameter portion 1a of the cylinder 1, the large diameter portion 1b of the cylinder 1, the small diameter piston portion 2a of the auxiliary piston 2, the larger diameter piston portion 2b of the auxiliary piston 2, and the non slidable external peripheral surface of the auxiliary piston 2. When the hydraulic pressure is generated in the hydraulic pressure chamber 34, the force obtained by multiplying the hydraulic pressure by dimension (A–B) which is calculated by subtracting a dimension B of a circle whose diameter corresponds to an external diameter of the small diameter piston portion 2a from a dimension A of a circle whose diameter corresponds to an external diameter of the large diameter piston portion 2b affects the auxiliary piston 2 for biasing the auxiliary piston 2 backward.

The auxiliary pressure source 39 generates and outputs the predetermined hydraulic pressure P1 irrespective of the operational force of the brake pedal 12, that is the braking operational force. The auxiliary pressure source 39 includes an accumulator for accumulating the operation fluid under pressurerized state, a pressure force sensor 19 serving as an auxiliary hydraulic pressure detection means for detecting the hydraulic pressure P1 accumulated in the accumulator 18 to output to the controller 70, a direct current motor 16 driven in accordance with the detected output of the pressure sensor 19 by the controller 70, and a hydraulic pump 17 for pressure feeding the operational fluid in the reservoir 20 to the accumulator 18 by being actuated by the direct current motor 16. The hydraulic pressure P1 in the accumulator 18 is predetermined to be maintained between a predetermined upper limit and lower limit. The hydraulic pressure P1 outputted from the auxiliary pressure source 39 is supplied to the high pressure chamber 35.

The auxiliary piston 2 coaxially includes an interior space 2e on a rear side and an interior space 2h on a front side. A penetration bore 2i is coaxially formed between the interior space 2e and the interior space 2h. A spool 3 having a flange portion is slidably inserted in the penetration bore 2i. The spool 3 is always biased rearward by a spring 13 compressively provided in the interior space 2h. Thus, as shown in FIG. 1, the spool 3 is placed on an initial position by contacting a rear end surface of the flange portion to a rear end surface of the interior space 2h under non braking state.

An output chamber 38 is formed in a space defined by a front end portion of the spool 3 and the interior space 2h. The hydraulic pressure generated in the output chamber 38 is supplied to the hydraulic pressure chamber 34 via a communication passage 2g provided on the auxiliary piston 2.

A pillar member 5 always contacts a rear end portion of the spool 3 via a steel ball 4. The pillar member 5 is slidably inserted into a cylindrical member 6 fixed to a front end surface side of the interior space 2e of the auxiliary piston 2. A cup member 9 is slidably outfitted on an external peripheral surface of the cylinder member 6. The cup member 9 is always biased forward by a biasing force of a spring 10 compressively provided between a rear end surface of the cup member 9 and a member 11 slidably and fluid tightly provided inside of the rear end portion of the interior space 2e. The member 11 is connected to the brake pedal 12 (i.e., braking operation member). An initial position of the brake pedal 12 is defined by a position where a rear end surface of the member 11 biased backward by the biasing force of the spring 10 contacts the rear end surface of the interior space 2e of the auxiliary piston 2. The spring 10 functions as a stole simulator for adjusting a relationship between a stroke of the brake pedal 12 and a depression force to meet the operational feeling of the driver. A set load of the sprig 10 is predetermined to be smaller than a set load of the spring 13. The stroke or the depression force (i.e., operational force) of the brake pedal 12 can be detected by a stroke sensor 71 or a depression force sensor 71 (i.e., serving as a braking operational amount detection means) respectively. An output signal of the stroke sensor 71 or the depression force sensor 71 is supplied to the controller 70.

A pillar shaped rubber disc 8 is provided on a bottom portion of the cup member 9. The rubber disc 8 receives a force in the forward direction from a bottom surface of the cup member 9 and receives a force in the rearward direction from a rear end surface of the pillar member 5 under the non-braking state. When the cup member 9 is moved forward equal to or greater than a predetermined amount relative to the auxiliary piston 2, a front end surface of an outer area of the rubber disc 8 which does not contact the rear end surface of the pillar member 5 contacts a rear end surface of the cylinder portion 6 via a resin-made ring 7. Thus, the rubber disc 8 receives the force in the rearward direction from the rear end surface of the cylinder portion 6, that is, from the auxiliary piston 2. Accordingly, the rubber disc 8 includes a function for distributing the braking operational force generated by the operation of the brake pedal 12 into the auxiliary piston 2 and the spool 3. A low pressure chamber 37 for being always in communication with the low pressure chamber 36 which is always in communication with the reservoir 20 is formed as a space defined by the interior space 2e of the auxiliary piston 2, the member 11, and the spool 3.

With the construction in the forgoing manner, on one hand, the spool 3 is biased in the forward direction by a distributed force out of the operational force of the brake pedal 12 transmitted to the rubber disc 8 via the member 11, the spring 10, and the cup member 9 and distributed by the rubber disc 8 for affecting the rear end surface of the pillar member 5. On the other hand, the spool 3 is biased in the rearward direction by the hydraulic pressure in the output chamber 38 and the biasing force of the spring 13. The spool 3 slides relative to the auxiliary piston 3 following the power relations between the force in the forward direction by the force affecting on the rear end surface of the pillar member 5 and the force in the rearward direction by the biasing force of the spring 13 and the hydraulic pressure in the output chamber 38.

The spool 3 is constructed to establish a communication with the output chamber 38, the low pressure chamber 37, and the reservoir 20 via communication passages formed therein when positioned as shown in FIG. 1. When the spool 3 is moved forward relative to the auxiliary piston 2 by a predetermined amount from the position shown in FIG. 1, the spool 3 is constructed to establish the communication with the output chamber 38 and the high pressure chamber 35, that is, the chamber serving as a hydraulic pressure generation device in which the high pressure P1 is generated. Thus, the spool 3 enables to regulate a hydraulic pressure P2 in the output chamber 38 by its relative position to enable to regulate the hydraulic pressure P2 in the output chamber 38 to be the hydraulic pressure in accordance with the operational force of the brake pedal 12. The spool 3 and the spring 13 serve as a regulator.

The hydraulic pressure P2 in the output chamber 38 is supplied to the hydraulic pressure chamber 34 via the communication passage 2g and is supplied to a hydraulic pressure regulator. The hydraulic pressure regulator accordingly depressurizes the hydraulic pressure P2 in the output chamber 38 and accordingly depressurizes the hydraulic pressure P1 in the high pressure chamber 35 to supply a hydraulic pressure P4 corresponding to the depressurized hydraulic pressure P2 and the hydraulic pressure P1 to the auxiliary hydraulic pressure chamber 33, and the anti-lock brake devices 62, 63 via the hydraulic passages 31, 30. By affecting the hydraulic pressure P4 in the auxiliary chamber 33 on the front end surface 2f of the auxiliary piston 2, the auxiliary piston 2 is maintained at an initial position determined by a contact between the rear end surface of the maximum diameter piston portion 2d and a stepped front surface of the rear end portion of the cylinder 1 by a biasing force obtained by multiplying the dimension B (i.e., the dimension B of the circle whose diameter corresponds to the external diameter of the small diameter piston portion 2a) of the front end surface 2f by the hydraulic pressure P4 (i.e., B·P4). By affecting the hydraulic pressure P4 in the auxiliary pressure chamber 33 to the rear side surface of the master piston 14, the master piston 14 is driven forward to generate the hydraulic pressure P3 in the pressure chamber 32. The generated hydraulic pressure P3 is supplied to the anti-lock brake devices 60, 61 via the hydraulic passage 23.

The master piston 14 is always biased rearward by the biasing force of a spring 15 compressively provided between a bottom surface of a recess portion 14a formed on a front side surface of the master piston 14 and the bottom surface 1c of the cylinder 1. As shown in FIG. 1, the master piston 14 is positioned on the initial position by a contact between the rear end surface of the master piston 14 and the front end surface 2f of the auxiliary piston 2 under the non braking state. When the master piston 14 is under the initial position, the pressure chamber 32 is in communication with the reservoir 20 and thus the hydraulic pressure P3 in the pressure chamber 32 corresponds to the atmospheric pressure. With this embodiment, because a front surface side pressure receiving dimension of the master piston 14 is identical to a rear surface side pressure receiving dimension of the master piston 14, the hydraulic pressure P3 in the pressure chamber 32 corresponds to the hydraulic pressure subtracting the hydraulic pressure corresponding to the biasing force of the spring 15 to the master piston 14 from the hydraulic pressure P4 in the auxiliary pressure chamber 33.

The hydraulic pressure regulator includes a normal open type solenoid valve 28 connected to the output chamber 38 on the upstream side and connected to the hydraulic passage 31 on the downstream side, a normal closed type servo solenoid valve 29 connected to the hydraulic passage 31 on the upstream side and connected to the low pressure chamber 36 and thus to the reservoir 20 on the downstream side, a normal closed type servo solenoid valve 40 connected to the high pressure chamber 35 on the upstream side and connected to the hydraulic passage 31 on the downstream side, a pressure sensor serving as an output hydraulic pressure detection means 22 for detecting the hydraulic pressure P2 in the output chamber 38 to output to the controller 70, and a pressure sensor 21 serving as an output hydraulic pressure detection means for detecting the hydraulic pressure P3 in the pressure chamber 32 to output to the controller 70. The controller 70 depressurizes the hydraulic pressure P2 in the output chamber 38 or the hydraulic pressure P1 in the high pressure chamber 35 to be reduced to the pressure which should be generated in the hydraulic pressure circuit 31. Then the depressurized hydraulic pressure is supplied to the auxiliary pressure chamber 33, and the anti-lock brake devices 62, 63.

The operation of the hydraulic brake device according to the embodiments of the present invention will be explained as follows.

A case that the auxiliary pressure source 39 and the pressure regulator normally function and a normal hydraulic pressure in accordance with the operational force of the brake pedal 12 is outputted to the output chamber 38 will be explained. When the brake pedal 12 is operated from the non braking state shown in FIG. 1, the braking operational force is distributed into the spool 3 and the auxiliary piston 2 via the rubber disc 8. Then, the spool 3 moves forward relative to the auxiliary piston 2 against the biasing force of the spring 13 by the distributed force to the spool 3. When the spool 3 is moved forward by a predetermined amount relative to the auxiliary piston 2, the communication between the output chamber 38 and the high pressure chamber 35 is established to generate the hydraulic pressure P2 in the output chamber 38. By this time, the auxiliary piston 2 is always maintained at an initial position shown in FIG. 1 by the biasing force of the spring 15 via the master piston 14.

When the hydraulic pressure P2 is generated in the output chamber 38, the spool 3 is slidably moved being balanced by the biasing force in the forward direction by the distributed force to the spool 3 via the rubber disc 8 and the biasing force in the rearward direction by the hydraulic pressure P2 and the biasing force of the spring 13. The hydraulic pressure P2 in the output chamber 38 is regulated to be the hydraulic pressure in accordance with the operational force of the brake pedal 12. The regulated hydraulic pressure P2 is introduced to the hydraulic pressure chamber 34 via the communication passage 2g to bias the auxiliary piston 2 in the rearward direction. This biasing force in the rearward direction corresponds to the value multiplying the hydraulic pressure P2 by the dimension (A−B) after subtracting the dimension B of the circle whose diameter corresponds to the external diameter of the small diameter piston portion 2a from the dimension A of the circle whose diameter corresponds to the external diameter of the large diameter piston portion 2b (i.e., P2·(A−B)).

The hydraulic pressure P2 in the output chamber 38 is introduced into the hydraulic pressure regulator. In the hydraulic pressure regulator, the controller 70 depressurizes the hydraulic pressure P1 in the high pressure chamber 35 or the hydraulic pressure P2 in the output chamber 38 to the hydraulic pressure P4 which should to be generated in the hydraulic circuit 31 at the moment based on the information from each sensor to supply the depressurized hydraulic pressure P4 to the auxiliary pressure chamber 33, and the anti-lock brake devices 62, 63. The controller 70 observes the hydraulic pressure P4 which is approximately the same to the pressure of the hydraulic pressure P3 by observing the hydraulic pressure P3 in the pressure chamber 32 which is detected by the pressure sensor 21.

By controlling the hydraulic pressure regulator, the components positioned upstream side of the anti-lock brake devices 60–63 (i.e., hereinafter referred as a hydraulic pressure generating circuit portion) function both as a hydraulic pressure generating device for generating and outputting the hydraulic pressure P2 in accordance with the braking operational amount and as an automatic hydraulic pressure generating device for regulating the pressure of the hydraulic pressure P1 supplied from the auxiliary pressure source 39 irrespective of the braking operation to be outputted. The automatic hydraulic pressure generating device is applied for performing the automatic braking control irrespective of the driver's intention for braking such as an automatically adaptive cruise control.

When the hydraulic pressure generating circuit portion is functioned as the hydraulic pressure generating device, the controller 70 opens the normal open type solenoid valve 28 and closes the normal closed type servo solenoid valves 29, 40. In this case, the hydraulic pressure P2 in accordance with the braking operational amount is supplied to the hydraulic passage 31 and thus to the anti-lock brake devices 62, 63. Further, the hydraulic pressure P3 having approximately the same pressure with the hydraulic pressure P4 (i.e., equal to P2) in the hydraulic passage 31 is supplied to the anti-lock brake devices 60, 61 via the auxiliary pressure chamber 33, the master piston 14, the pressure chamber 32, and the hydraulic passage 23.

When the hydraulic pressure generating circuit portion is functioned as the automatic hydraulic pressure generating device, the controller 70 closes the normal open type solenoid valve 28 and accordingly controls the opening and closing of the normal closed type servo solenoid valves 29, 40. In this case, the high pressure P1 in the high pressure chamber 35, depressurized irrespective of the braking operation or as it is, is supplied to the hydraulic passage 31 and thus to the anti-lock brake devices 62, 63. Further, the hydraulic pressure P3 approximately equal to the pressure of the hydraulic pressure P4 in the hydraulic passage 31 is supplied to the anti-lock brake deices 60, 61 via the auxiliary hydraulic chamber 33, the master piston 14, the pressure chamber 32, and the hydraulic passage 23.

The hydraulic pressure P3 after being regulated with the hydraulic pressure regulator, which is supplied to the anti-lock brake devices 60, 61, and the hydraulic pressure P4 after being regulated with the hydraulic pressure regulator, which is supplied to the anti-lock brake devices 62, 63, are regulated by the anti-lock brake devices 60, 61 and the anti-lock brake devices 62, 63 to be supplied to the wheel cylinders 24, 25 and to the wheel cylinders 26, 27 respectively. Thus, a desired braking force is applied to each wheel.

In case the auxiliary pressure source 39 and the pressure regulator function normal and a normal hydraulic pressure in accordance with the operational force of the brake pedal 12 is outputted to the output chamber 38 during the braking operation performance, the auxiliary piston 2 is affected by not only the biasing force in the rearward direction calculated by multiplying the hydraulic pressure P4 by the dimension B (i.e., P4·B) by the hydraulic pressure P4 in the auxiliary pressure chamber 33 but also by the biasing force in the rearward direction calculated by multiplying the hydraulic pressure P2 by the dimension subtracting the dimension B from the dimension A (i.e., P2·(A−B)) by the hydraulic pressure P2 in the hydraulic pressure chamber 34. The auxiliary piston 2 is maintained at the initial position shown in FIG. 1 by the biasing force in the rearward direction.

The case that the hydraulic pressure P2 is not outputted to the output chamber 38 due to the failure of at least one of the auxiliary pressure source 39 and the pressure regulator. Under this condition, because the rubber disc 8 does not receive the biasing force in the rearward direction from the spool 3, thus from the pillar member 5, the rubber disc 8 transmits all operational force from the brake pedal 12 to the auxiliary piston 2. Thus, the auxiliary piston 2 moves forward by the operational force of the brake pedal 12. In accordance with the forward movement of the auxiliary piston 2, the master piston 14 moves forward unitary with the auxiliary piston 2 while maintaining the contact with the front end surface 2$f$ of the auxiliary piston 2 and the rear end surface of the master piston 14. In accordance with the forward movement of the master piston 14, the hydraulic pressure P3 is generated in the pressure chamber 32 to apply the braking force to each wheel corresponding to the wheel cylinders 24, 25. Accordingly, the braking hydraulic pressure is ensured even when the hydraulic pressure P2 is not outputted to the output chamber 38 due to the failure of at least one of the auxiliary pressure source 39 and the pressure regulator.

A function of an air-containing detection means will be explained as follows. The controller 70 serves as the air-containing detection means. Various controls performed by the controller 70 functioning as the air-containing detection means will be explained referring to flowcharts and timing charts. The various controls performed by the controller 70 functioning as the air-containing detection means is carried out irrespective of the driving state (i.e., either during the vehicle driving or when the vehicle is stopped) both when functioning the hydraulic pressure generating circuit portion as the hydraulic pressure generating device for generating the hydraulic pressure in accordance with the braking operational amount to be outputted and as the automatic hydraulic pressure generating device.

In case the hydraulic pressure generating circuit portion is functioned as the automatic hydraulic pressure generating device and the control is performed during the vehicle running state and under the non braking state, the control is performed under the condition that normal open type solenoid valves 42, 45, 54, 57 are closed. Thus, the detection of the air-containing in the hydraulic circuit is performed without applying the braking force to the vehicle during the vehicle running state.

The controller 70 recognizes that the vehicle is stopped by recognizing an output signal from the wheel speed sensor 72 corresponding to the signal showing vehicle speed of four wheels being zero.

Figure 5:
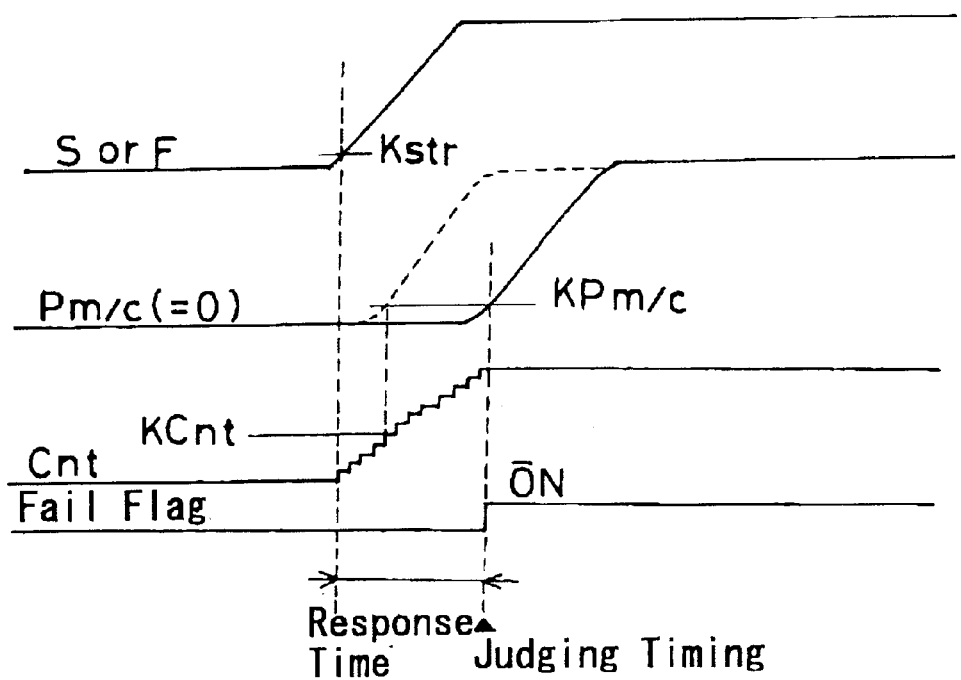
FIG. 5 is a timing chart for each physical quantity when performing the first control method according to FIG. 2 of the present invention.

A first control method of a first embodiment performed by the controller 70 serving as the air-containing detection means will be explained referring to FIGS. 2 and 5. The first control method is based on a principle that a response time until a master cylinder pressure Pm/c (i.e., equal to P3 and approximately equal to P4) risen after staring the braking operation is delayed when the air is included in the hydraulic circuit. FIG. 2 shows a flowchart for the first control method performed by the controller 70 serving as the air-containing detection means. FIG. 5 shows a timing chart of each physical quantity when performing the first control method. A horizontal axis corresponds to time in FIG. 5. The first control method is performed when the hydraulic pressure generating circuit portion functions as the hydraulic pressure generating device which generates and outputs the hydraulic pressure in accordance with the brake operational amount, that is, when the normal open type solenoid valve 28 is open and the normal closed type servo solenoid valves 29, 40 are closed.

As shown in FIG. 2, in Step 101, zero (i.e., 0) is substituted for a counter Cnt. The counter Cnt counts the response time of the rise of the master cylinder pressure Pm/c (i.e., equal to P3 and approximately equal to P4).

In Step 102, OFF is substituted for a fail flag. The fail flag OFF corresponds to a state that the hydraulic circuit is normally operated. A fail flag ON corresponds to a state that the air is included in the hydraulic circuit, or the fluid is leaked from the normal close solenoid valves 43, 46, 55, 58 and from the normal closed type servo solenoid valve 29. Step 101 and Step 102 correspond to an initialization step for performing the following control. The following steps of control are repeatedly transacted as a loop transaction by a control cycle of the controller 70.

In Step 103, it is judged whether a stroke S of the brake pedal 12 is greater than a threshold valve Kstr. When the stroke S is greater than the threshold value Kstr, the start of the braking operation is judged, that is, it is judged that a rise of a stroke amount of the brake pedal 12 is started. When the stroke S is equal to or less than the threshold value Kstr, it is judged that it is under non braking state. The threshold valve Kstr may be zero or may be a predetermined positive value approximate to zero. Whether the brake operation is started may be-judged by using a depression force F of the brake pedal 12 instead of the stroke S. In Step 103, when the stroke S is equal to or less than the threshold value Kstr, it is judged that it is under the non braking state to wait until the start of the braking operation is judged. In Step 103, when the stroke S is greater than the threshold value Kstr, the start of the rise of the stroke amount of the brake pedal 12 is judged to forward the transaction to Step 104.

In Step 104, the counter Cnt is incremented by one (i.e., 1) to forward the transaction to Step 105.

In Steps 105, 106, the counter Cnt judges the response time from the start of the braking operation until the master cylinder pressure Pm/c is risen and it is judged whether the response time (i.e., corresponding to Cnt) is longer than a response time (i.e., corresponding to a constant KCnt) under a normal state in which the air is not included in the hydraulic circuit.

In practice, in Step 105, it is judged whether the master cylinder pressure Pm/c is greater than the threshold value KPm/c. The master cylinder pressure Pm/c is gradually increased from zero. When the master cylinder pressure Pm/c becomes greater than the threshold value Kpm/c, it is judged that the master cylinder pressure Pm/c is risen, and then the transaction is forwarded to Step 106. When the master cylinder pressure Pm/c is equal to or less than the threshold value KPm/c, it is judged than the master cylinder pressure Pm/c has not risen, and the transaction is returned to Step 103 to repeat the above mentioned transactions. The threshold value KPm/c may be zero or may be a predetermined positive value approximate to zero.

In Step 106, it is judged whether the counter Cnt is greater than the constant KCnt. The constant KCnt corresponds to the response time of the master cylinder Pm/c under the normal state in which the air is not included in the hydraulic circuit. The constant KCnt is pre-memorized in the controller 70. When the value of counter Cnt is equal to or less than the value of the constant Kcnt, it is considered that the response time of the master cylinder Pm/c is equal to or shorter than under the normal state and thus, it is judged that the hydraulic circuit is under the normal state. In this case, the transaction is forwarded to Step 108, the counter Cnt is substituted for zero in Step 108. Then, the transactions after Step 103 are repeatedly performed.

In Step 106, when the value of the counter Cnt is greater than the value of the constant KCnt, it is considered that the response time of the master cylinder Pm/c is longer than the response time under the normal state, and is judged that the air is included in the hydraulic circuit or the leak of the fluid from various normal close solenoid valves is generated. In this case, the transaction is advanced to Step 107, the fail flag is substituted for ON, and an alarming transaction is performed in Step 109. The alarming transaction includes a transaction for lighting an air-containing alarming lamp provided within a range viewed from a driving seat of a vehicle. During the lightening of the air-containing alarming lamp under the braking operation, the recirculation hydraulic pumps 49, 52 are operated by the motor 50. When the fluid is leaked from at least one of the normal closed type solenoid valves 43, 46, 55, 58, the operation fluid reserved in the reservoirs 48, 51 is recirculated into the hydraulic circuit.

FIG. 5 shows the timing chart of each physical quantity when performing the first control method explained above. A value shown with a doted line of the master cylinder pressure Pm/c of FIG. 5 shows the value under a normal condition that the air is not included in the hydraulic circuit and a value shown with an actual line shows the value of the case when the air is included in the hydraulic circuit or when the fluid is leaked from various normal closed type solenoid valves. When the air is included in the hydraulic circuit, the rise of the master cylinder pressure Pm/c is delayed and the counter Cnt exceeds the threshold value KCnt at a timing when the master cylinder Pm/c exceeds the threshold value KPm/c, that is the timing at the rise of the master cylinder pressure Pm/c. This leads the judgment YES in Step 106 of FIG. 6 to perform the alarming transaction.

The first control method according to the first embodiment is performed when the hydraulic pressure generating circuit portion functions as the automatic hydraulic pressure generating device, that is, when the normal open type solenoid valve 28 is open, the normal closed type servo solenoid valve 29 is open, and the normal closed type servo solenoid valve 40 is open. With this method, Step 103 of the flowchart shown in FIG. 2 is changed to a transaction for judging whether an automatic pressurization is started. A timing chart of each physical quantity in this case is shown in FIG. 6. A value shown with a doted line of the master cylinder Pm/c of FIG. 6 shows a normal condition that the air is not included in the hydraulic circuit and a value shown with the actual line shows a condition that the air is included in the hydraulic circuit or when the fluid is leaked from the various normal closed type solenoid valves.

A second control method according to a second embodiment performed by the controller 70 serving as the air-containing detection means will be explained referring to FIGS. 3 and 7. The second control method is based on a principle that a declining amount of an auxiliary hydraulic pressure Pacc (i.e., equal to the hydraulic pressure P1) in the accumulator 18 relative to an increment of the master cylinder pressure Pm/c (i.e., equal to the hydraulic pressure P3 and approximately equal to the hydraulic pressure P4) by the brake operation is increased when the air is included in the hydraulic circuit. FIGS. 3a, 3b are a series of flowchart of the second control method performed by the controller 70 serving as the air-containing detection means. FIG. 7 shows a timing chart of each physical amount when performing the second control method. A horizontal axis of FIG. 7 indicates time. The second control method is performed when the hydraulic pressure circuit portion functions as the hydraulic pressure generating device for generating and outputting the hydraulic pressure in accordance with the braking operational amount, that is when the normal open solenoid valve 28 is open and the normal closed type servo solenoid valves 29, 40 are closed. The second control method is performed when the hydraulic pump 17 is not actuated.

In Step 201 of FIG. 3a, a counter Cnt is substituted for zero. The counter Cnt is provided for ensuring a judging preparation time for judging whether the air is included until the auxiliary hydraulic pressure Pacc (i.e., hydraulic pressure P1) in the accumulator 18 is stabilized after the incrementing process of the braking operation amount (i.e., either stroke or the depressing force) is completed to stable the brake operation amount.

In Step 202, the fail flag is substituted for OFF. The fail flag OFF corresponds to a normal condition of the hydraulic circuit. The fail flag ON corresponds to the condition that the air is included in the hydraulic circuit and the fluid is leaked from the-normal closed type solenoid valves 43, 46, 55, 58 and from the normal closed type servo servo solenoid valve 29.

In Step 203, a flag F__M/C is substituted for OFF. The flag F__M/C is used for ensuring that the increment of the master cylinder pressure Pm/c from zero (i.e., from Pm/c=0) corresponding to the master cylinder pressure Pm/c under the non braking state in order to judge that the air is included using the declining amount of the auxiliary hydraulic pressure Pacc (i.e, equal to P1) in the accumulator 18 relative to the increment of the master cylinder pressure Pm/c (i.e., equal to P3 and approximately equal to P4) by the braking operation. That the increment amount of the master cylinder pressure Pm/c from zero is applied as the increment of the master cylinder pressure Pm/c is ensured by performing the judgment whether the air is included only when the flag F__M/C is ON.

Steps 201–203 corresponds to the initialization steps for performing the following control. The following steps are transacted repeatedly as a loop transaction by the control cycle of the controller 70.

In Step 204, it is judged whether an STP flag is ON. The STP flag becomes OFF when the output signal of the stroke sensor 71 or the depression force sensor 71 of the brake pedal 12 corresponds to a signal for the non braking state. The STP flag becomes ON when the output signal of the stroke sensor 71 or the depression force sensor 71 of the brake pedal 12 corresponds to a signal for the braking operation state. When it is judged that the STP flag is ON, that is when the brake is under operation, the transaction is forwarded to Step 205. When it is judged that the STP flag is OFF, that is when the brake is under non operation, the transaction is forwarded to Step 206.

In Step 206, an auxiliary hydraulic pressure Pacc in the accumulator 18 under the non braking state t_P1 is substituted at the moment. Because it is under the non braking state when forwarding to Step 206, the value of the auxiliary hydraulic pressure Pacc applied to $t_{13}$ P1 is the value under the non braking state. Then, the transaction is forwarded to Step 207. In Step 207, the flag F__M/C is substituted for ON. Step 207 is the only timing that the flag F__M/C turns from OFF state to ON state. After Step 207, the transaction is returned to Step 204 for repeating the transactions after Step 204. Step 204 secures for performing the Judgment whether the air is included only when the braking operational state is transmitted from the non braking state to the braking state and the braking state is continued.

When it is judged that the STP flag is ON, that is, it is judged being under the brake operation state, in Step 204, the transaction is forwarded to Step 205 to judge whether the flag F__M/C is ON. When the flag F__M/C is OFF, the transaction is returned to Step 204 because the air-containing judgment is not performed and the transactions after step 204 are repeated. When the flag F_M/C is ON in Step 205, the transaction is forwarded to Step 208.

In Step 208, it is judged whether a time differential value dPM/c of the master cylinder pressure Pm/c corresponding to a rising gradient of the master cylinder pressure Pm/c is smaller than a constant dKPm/c. In this case, it is judged whether the incrementing process of the brake operation amount (i.e., stroke or depression force) is completed. If the incrementing process of the brake operation amount is completed, it is considered that the incrementing process of the master cylinder pressure Pm/c is completed and the rising gradient dPm/c of the master cylinder pressure Pm/c becomes small because the increment of the braking operation amount (i.e., stroke or depression force) corresponds to the increment of the master cylinder pressure Pm/c. Thus, it is judged that the incrementing process of the brake operation amount is completed when the rising gradient dPm/c of the master cylinder pressure Pm/c is smaller than the constant dKPm/c, and the transaction is forwarded to Step 209 for judging whether the air is included.

On the other hand, when the rising gradient dPm/c of the master cylinder pressure Pm/c is equal to or greater than the constant dKPm/c, it is judged that the incrementing process of the brake operation amount has not completed. Because this shows that the preparation for judging whether the air is included has not completed, the counter Cnt is substituted for zero in Step 216, then the transaction is returned to Step 204 for repeating the transactions after Step 204. The reason why the counter is set as zero in Step 216 is for countering the case that the brake pedal 12 is additionally depressed under the condition that the counter Cnt had already incremented under a judging preparation time of air-containing. When the brake pedal 12 is additionally depressed, the rising gradient dPm/c of the master cylinder pressure Pm/c becomes equal to or greater than the constant dKPm/c to carry out Step 216.

In Step 209, the auxiliary hydraulic pressure Pacc in the accumulator 18 under braking state t_P2 is substituted at the moment. The value of t_P2 is always smaller than the value of t_P1 in Step 206 because t_P2 is the value under the brake operation state. Then, the transaction is forwarded to Step 201.

In Step 210, a value ΔPacc subtracting the value of t_P2 from the value of t_P1 is substituted. The ΔPacc corresponds to a declining amount of the auxiliary hydraulic pressure Pacc used for judging the air-containing. Then, the transaction is forwarded to Step 211.

In Step 211, a declining amount of the auxiliary hydraulic pressure t_Pacc is calculated from the master cylinder pressure Pm/c at the moment using a map pre-memorized in the controller 70. The t_Pacc corresponds to the declining amount of the auxiliary hydraulic pressure Pacc relative to the value of the master cylinder pressure Pm/c (i.e., that is increment of the master cylinder pressure from zero) under the normal condition of the hydraulic circuit. Then, the transaction is forwarded to Step 212.

In Step 212, it is judged whether the value of ΔPacc is greater than the value of t_Pacc. When the value of ΔPacc is equal to or less than the value of t_Pacc, it is judged that the hydraulic circuit is normally operated because the declining amount of the auxiliary hydraulic pressure ΔPacc is equal to or less than the declining amount of the auxiliary hydraulic pressure Pacc under normal state of hydraulic circuit. Then, the transaction is forwarded to Step 217. In Step 217, F_M/C is substituted for OFF and the transaction is returned to Step 204 for repeating the transactions after Step 204. In this case, because the F_M/C is OFF, the judgment for air-containing is not performed hereinafter by the judgment in Step 205. The judgment of the air-containing is performed again after the braking operation is once released and the transaction is forwarded from Step 204 to Step 207 and F_M/C is substituted for ON. In Step 212, when the value of ΔPacc is greater than the value of t_Pacc, it is judged that the air is included in the hydraulic circuit or the fluid is leaked from the closed normal closed type solenoid valves because it is considered that the declining amount ΔPacc of the auxiliary hydraulic pressure is greater than the declining amount of the auxiliary hydraulic pressure Pacc under normal hydraulic circuit operation. Then, the transaction is forwarded to Step 213.

In Step 213, it is judged whether the counter Cnt is greater than the constant KCnt. In this case, it is judged whether the judging preparation time (i.e., corresponding to a value of the constant KCnt) has elapsed. Although it is required that the auxiliary hydraulic pressure Pacc in the accumulator 18 is stabilized when judging the air-containing in the hydraulic circuit, the auxiliary hydraulic pressure Pacc in the accumulator 18 is not stabilized immediately after the completion of the incrementing process of the braking operational amount (i.e., master cylinder pressure Pm/c) to stabilize the brake operational amount (i.e., master cylinder pressure Pm/c). Thus, the elapse of the judging preparation time is waited in order to judge the air-containing after the auxiliary hydraulic pressure Pacc is stabilized. In Step 213, when the counter Cnt is greater than the constant KCnt, it is judged that the judging preparation time is elapsed to forward the transaction to Step 214. On the other hand, when the counter Cnt is equal to or less than the constant KCnt, it is judged that the judging preparation time has not elapsed and the transaction is forwarded to Step 218. In Step 218 the counter Cnt is incremented by one and the transaction is returned to Step 204 for repeating the transactions after Step 204.

In Steps 212 and 213, it is judged that the air is included in the hydraulic circuit or the fluid is leaked from the closed valves only when the value of ΔPacc is always greater than the value of t_Pacc during the entire judging preparation time. If once the value of ΔPacc becomes equal to or less than the value of t_Pacc during the judging preparation time, F_M/C is substituted for OFF in Step 217 and then the judgment of the air-containing is not performed unless braking operation is released once.

In Steps 212 and 213, when it is judged that the air is included in the hydraulic circuit or the fluid is leaked from the closed valves, the transaction is forwarded to Step 214. In Step 214, the fail flag is substituted for ON, then the alarming transaction is performed in Step 215. The alarming transaction includes a transaction for lighting an air-containing alarming lamp provided within a range viewed from a driving seat of a vehicle. During the lightening of the air-containing alarming lamp under braking operation, the recirculation hydraulic pumps 49, 52 are operated by the motor 50. When the fluid is leaked from at least one of the normal closed type solenoid valves 43, 46, 55, 58, the operation fluid reserved in the reservoirs 48, 51 is recirculated in the hydraulic circuit.

FIG. 7 shows a timing chart of each physical quantity when performing the second control method according to the second embodiment. A value shown with a dotted line of Pacc and Pm/c in FIG. 7 shows a normal state that the air is not included in the hydraulic circuit and a value shown with an actual line shows a state that the air is included in the hydraulic circuit or the fluid is leaked from the various normal closed type solenoid valves. When the air is included in the hydraulic circuit or the fluid is leaked from the various normal closed type solenoid valves, the declining amount of the auxiliary hydraulic pressure Pacc is increased and when the value of ΔPacc is always greater than the value of t_Pacc during the entire judging preparation time, and the judgment selects YES in Steps 212 and 213 of FIG. 3*b* to perform the alarming transaction.

The second control method according to the second embodiment may be performed based on a principle that the declining amount of the auxiliary hydraulic pressure Pacc in the accumulator 18 relative to the increment of the brake pedal depressing force F or the brake stroke S by the braking operation is increased when the air is included in the hydraulics circuit noting on that the increment of the master cylinder pressure Pm/c corresponds to the increment of the braking operational amount (i.e., stroke or depression force). In this case, Step 208 of FIG. 3*a* is changed to a transaction for the judgment relating to the rising gradient of the brake stole S or the brake pedal depression force F and the map of Step 211 is changed to a map of t_Pacc relative to the brake stroke S or the brake pedal depression force F.

The second control method according to the second embodiment performed by the controller 70 functioning as the air-containing detection means may be performed when the hydraulic pressure generating circuit portion functions as the automatic hydraulic pressure generating device, that is, when the normal closed type solenoid valve 28 is closed, the normal closed type servo solenoid valve 29 is closed, and the normal closed type servo solenoid valve 40 is open. In this case, Step 204 shown in the flowchart of FIG. 3*a* is changed to a transaction to judge whether the automatic pressurization is started.

A third control method according to a third embodiment performed by the controller 70 serving as air-containing detection means will be explained referring to FIGS. 4 and 8. The third control method is based on a principle that an increment of the master cylinder pressure Pm/c (i.e., equal to the hydraulic pressure P3 and approximately equal to the hydraulic pressure P4) after elapsing a predetermined time from the start of the automatic hydraulic pressure device is declined when the air is included in the hydraulic circuit. FIG. 4 is a flowchart of the third control method performed by the controller 70 serving as the air-containing detection means. FIG. 8 shows a timing chart of each physical quantity when performing the third control method. The horizontal axis indicates the time in FIG. 8. The third control method is performed when the hydraulic pressure generating circuit portion is functioned as the automatic hydraulic pressure generating device, that is when the normal open type solenoid valve 28 is closed, the normal type servo solenoid 29 is closed, and the normal closed type servo solenoid valve 40 is open.

In FIG. 4, a main transaction routine is performed immediately after starting the automatic pressurizing control (i.e., starting the operation of the automatic hydraulic pressure generating device). In Step 301, the fail flag is substituted for OFF. The fail flag OFF corresponds to the normal state of the hydraulic circuit. The fail flag ON corresponds to a state that the air is included in the hydraulic circuit and a state that the fluid is leaked from the normal closed type solenoid valves 43, 46, 55, 58, and from the normal close servo solenoid valve 29.

In Step 302, a counter t_judge is substituted for zero (i.e. 0). The counter t_judge judges whether a pre-calculated predetermined time (i.e., corresponding to a constant Kjudge) in Step 304 has elapsed. Steps 301 and 302 correspond to the initialization step for performing the following control. The following transaction is repeated as a loop transaction by a control cycle of the controller 70.

In Step 303, the counter t_judge is incremented by one to forward the transaction to Step 304.

In Step 304, it is judged whether the counter t_judge and a constant Kjudge are identical to each other. When the counter t_judge is identical to the constant Kjudge, it is judged that predetermined time has elapsed to be ready for judging the air is included in the hydraulic circuit or the fluid is leaked from the closed valves. Then, the transaction is forwarded to Step 305. In Step 304, when the counter t_judge is not reached the constant Kjudge, it is judged that the predetermined time has not elapsed to repeat the transaction from Step 303 until the predetermined time elapses.

In Step 305, it is judged whether the master cylinder pressure Pm/c is greater than the threshold value KPm/c. When the master cylinder pressure Pm/c is greater than the threshold value KPm/c, it is judged that the air is included in the hydraulic circuit or the fluid is leaked from the closed valves and the transaction is forwarded to Step 306. In Step 306, the counter t_judge is cleared and the transaction from Step 303 is repeatedly carried out. In Step 305, when the master cylinder pressure Pm/c is equal to or less than the threshold value KPm/c, it is judged that the air is included in the hydraulic circuit or the fluid is leaked from the closed valves and the transaction is forwarded to Step 307. In Step 307, the fail flag is substituted for ON and the alarming transaction is performed in Step 308. The alarming transaction includes a transaction for lighting an air-containing alarming lamp provided within a range viewed from a driving seat of a vehicle. During the lightening of the air-containing alarming lamp under braking operation, the recirculation hydraulic pumps 49, 52 are operated by the motor 50. When the fluid is leaked from at least one of the normal closed type solenoid valves 43, 46, 55, 58, the operation fluid reserved in the reservoirs 48, 51 is recirculated in the hydraulic circuit.

A predetermined time corresponding to the constant Kjudge in Step 304 may be defined as an automatic pressurizing time under normal state from the start of the automatic pressurizing control until completing thereof under the normal state of the hydraulic circuit. The automatic pressurizing time under normal state is varied depending on a pressurization target value Pm/c1 of the master cylinder pressure Pm/c. Thus, when the automatic pressurizing time under normal state is applied as the predetermined time, the controller 70 calculates the automatic pressurizing time under normal state from the pressurization target value Pm/c1 and a map for calculating the constant Kjudge corresponding to the calculated automatic pressurizing time under normal state is required.

The timing chart of each physical quantity when performing the third control method is shown in FIG. 8. A value shown with a dotted line of Pm/c in FIG. 8 shows a normal state that the air is not included in the hydraulic circuit and a value shown with the actual line shows a case that the air is included in the hydraulic circuit or the fluid is leaked from various normal closed type solenoid valves. When the air is included in the hydraulic circuit or the fluid is leaked from various normal closed type solenoid valves, the rise of the master cylinder pressure Pm/c is delayed and the master cylinder pressure Pm/c does not exceed KPm/c when the automatic pressurizing time under normal state (i.e., corresponding to Kjudge) has elapsed. Thus, the judgment is lead to NO in Step 305 of FIG. 4 and the alarming transaction is performed.

The hydraulic brake device of the present invention is not limited to the hydraulic brake device shown in FIG. 1. For example, the hydraulic brake device shown in FIG. 1 may include a permeating air invasion prevention mechanism which prevents the air permeated from an air chamber in the accumulator from invading into other portion of the hydraulic circuit in the hydraulic pressure circuit in which the hydraulic pressure P1 is generated.

With the hydraulic brake device according to the embodiments, the hydraulic brake device for applying the braking force to wheels of the vehicle which can detect the air-containing in the hydraulic circuit is provided.

A volumetric elastic coefficient of the fluid in the hydraulic circuit is declined when the air is included in the hydraulic circuit. When the volumetric elastic coefficient of the fluid is declined, the rise of the hydraulic pressure when compressing the fluid is delayed. With the hydraulic brake device according to the embodiment, the air-containing detection means detects the air-containing in the hydraulic circuit in accordance with the response time relating to the rise of the output hydraulic pressure detected by the output hydraulic pressure detecting means responding to the start of the rise of the braking operation amount detected by the braking operational amount detection means. When the air is included in the hydraulic circuit, the response time is delayed compared to the case under normal state with no air included in the hydraulic circuit. In virtue of using this characteristics, the air-containing in the hydraulic circuit can be detected.

As mentioned above, the volumetric elastic coefficient of the fluid in the hydraulic circuit is declined when the air is included in the hydraulic circuit. When the volumetric elastic coefficient of the fluid is declined, the supply amount of the fluid which should be supplied from outside is increased when increasing the pressure of the fluid by a predetermined amount. With the hydraulic brake device according to the second embodiment, the air-containing detection means detects the air-containing in the hydraulic circuit by the declining amount of the auxiliary hydraulic pressure detected by the auxiliary hydraulic pressure detection means responding to the increment of the output hydraulic pressure detected by the output hydraulic pressure detection means and outputted from the regulator when the hydruailc pressure pump of the auxiliary hydraulic source is not actuated. When the air is included in the hydraulic circuit, the supplied amount of the fluid supplied from the auxiliary hydraulic source for increasing the pressure of the output hydraulic pressure by a predetermined amount is increased compared to the case under the normal state with no air is included when the hydraulic pump of the auxiliary hydraulic source is not actuated. Because the hydraulic pump of the auxiliary hydraulic source is stopped in this case, the more increased the supply amount of the fluid supplied to the output hydraulic pressure side, the more declined the auxiliary hydraulic pressure of the auxiliary source. Thus, when the air is included in the hydraulic circuit, the declining amount of the auxiliary hydraulic pressure of the auxiliary hydraulic source is increased compared to the case that the air is not included in the hydraulic circuit. In virtue of this characteristics, the air-containing in the hydraulic circuit can be detected.

Under a state that the hydraulic pump of the auxiliary hydraulic source is not actuated, the air-containing detection means according to the second embodiment detects the air-containing in the hydraulic circuit by the declining amount of the auxiliary hydraulic pressure responding to the increment of the output hydraulic pressure. On the other hand, the air-containing detection means according to the first variation of the second embodiment detects the air-containing in the hydraulic circuit by the declining amount of auxiliary hydraulic pressure responding to the increment of the braking operation amount under the state that the hydraulic pump of the auxiliary hydraulic source is not actuated. Because the output hydraulic pressure outputted by the regulator is regulated to be the hydraulic pressure in accordance with the braking operation amount by the regulator, the increment of the output hydraulic pressure outputted by the regulator consequently corresponds to the increment of the braking operational amount. Thus, detecting the air-containing in the hydraulic circuit based on the air-containing detection means of the first variation of the second embodiment consequently equals to detecting the air-containing in the hydraulic circuit based on the air-containing detection means according to the second embodiment. Accordingly, the air-containing in the hydraulic circuit can be detected by the first variation of the second embodiment.

It is preferable that the braking operation amount according to the first or the first variation of the second embodiment corresponds to the stroke amount of the braking operational member or operational force of the braking operational member. With this construction, the braking operational amount detection means, which includes the stroke sensor or the depression force sensor, can be achieved with a simple construction.

With the hydraulic brake device according to the first embodiment, the hydraulic pressure generating device for generating and outputting the hydraulic pressure in accordance with the braking operational amount is applied as a device for supplying the hydraulic pressure to the wheel cylinders. On the other hand, with the hydraulic brake device according to the variation of the first embodiment, the automatic hydraulic pressure generating device including the auxiliary hydraulic source for generating and outputting the predetermined high pressure irrespective of the braking operation and for regulating and outputting the hydraulic pressure supplied from the auxiliary hydraulic source irrespective to the braking operation is applied as a device for supplying the hydraulic pressure to the wheel cylinders. The automatic hydraulic pressure generating device is applied when the generation of the braking force is required to the vehicle without operating the braking operational member, for example, when performing the automatic adaptive cruise control.

With the hydraulic brake device according to the variation of the first embodiment, the air-containing in the hydraulic circuit is detected based on the essentially identical principle to the first embodiment. That is, with the hydraulic brake device according to the variation of the first embodiment, the air-containing in the hydraulic circuit is detected by the response time relating to the rise of the output hydraulic pressure detected by the output hydraulic pressure detection means responding to the start of the operation of the automatic hydraulic pressure generating device. When the air is included in the hydraulic circuit, the response time is delayed compared to the case under the normal state that the air is not included in the hydraulic circuit. In virtue of this characteristics, the air-containing in the hydraulic circuit can be detected.

With the hydraulic brake device according to the third embodiment, the air-containing in the hydraulic circuit is detected based on the essentially identical principle to the first embodiment. That is, the air-containing detection means of the third embodiment detects the air-containing in the hydraulic circuit by the increment of the output hydraulic pressure detected by the output hydraulic pressure detection means after elapsing the predetermined time from the start of the operation of the automatic hydraulic pressure generating device. When the air is included in the hydraulic circuit, the response time relating to the rise of the output hydraulic pressure from the start of the operation of the automatic hydraulic pressure generating device is delayed compared to the case under the normal state that the air is not included in the hydraulic circuit. Thus, when the air is included in the hydraulic circuit, the increment of the output hydraulic pressure after elapsing of the predetermined time from the start of the automatic hydraulic pressure generating device is declined. In virtue of this characteristics, the air-containing in the hydraulic circuit can be detected.

With the hydraulic brake device according to the second embodiment, the regulator for regulating the hydraulic pressure supplied from the auxiliary hydraulic source in accordance with the braking operational amount to output is applied as a device for supplying the hydraulic pressure to the wheel cylinder. On the other hand, with the hydraulic brake device according to the second variation of the second embodiment, the accumulator for accumulating the hydraulic pressure and the hydraulic pump for supplying the hydraulic pressure to the accumulator are included and the automatic hydraulic pressure generating device having the auxiliary hydraulic pressure for generating and outputting the high pressure within the predetermined range irrespective of the braking operation by intermittently actuating the hydraulic pump for regulating the hydraulic pressure supplied from the auxiliary hydraulic source irrespective of the braking operation to output is adopted as the device for supplying the hydraulic pressure to the wheel cylinders.

With the hydraulic brake device according to the second variation of the second embodiment, the air-containing in the hydraulic circuit is detected based on the principle essentially identical to the second embodiment. That is, the air-containing detection means of the second variation of the second embodiment detects the air-containing in the hydraulic circuit by the declining amount of the auxiliary hydraulic pressure responding to the increment of the output hydraulic pressure after starting the operation of the automatic hydraulic pressure generating device under the state that the hydraulic pump is not actuated. Likewise the second embodiment, with the hydraulic brake device according to the second variation of the second embodiment, in virtue of the characteristics that the declining amount of the auxiliary hydraulic pressure of the auxiliary hydraulic source is increased when the air is included in the hydraulic circuit compared to the case the air is not included, the air-containing in the hydraulic circuit can be detected.

With the hydraulic brake device according to the embodiments, it is preferable that the vehicle stopped state judging means for judging the stopped state of the vehicle is included, the automatic hydraulic pressure generating device is operated while the vehicle stopped state judging means judges that the vehicle is under stopped state, and air-containing in the hydraulic circuit is detected by the air-containing detection means. With this construction, the air-containing in the hydraulic circuit can be detected under the stopped state of the vehicle. Thus, the air-containing can be alarmed to the driver before restarting the vehicle driving.

With the hydraulic brake device according to the embodiments, it is preferable that the solenoid valves are provided between the automatic hydraulic pressure generating device and the wheel cylinders, the automatic hydraulic pressure generating device is operated under the state that the solenoid valves are closed, and the air-containing in the hydraulic circuit is detected by the air-containing detection means. With this operation, because the solenoid valves are closed even when the automatic hydraulic pressure generating device is operated, the hydraulic pressure generated by the automatic hydraulic pressure generating device is not transmitted to the wheel cylinders. Thus, the air-containing in the hydraulic circuit can be detected without generating the braking force by operating the automatic hydraulic pressure generating device under the state that the braking is not operated even during the vehicle traveling.

With the hydraulic brake device according to the embodiments, it is preferable that the hydraulic brake device includes the anti-lock brake devices including the normal open type solenoid valves provided between the wheels cylinders and any one of the hydraulic pressure generating device, the regulator, or the automatic hydraulic pressure generating device, the normal closed type solenoid valves provided between the wheel cylinders and the reservoirs, and the recirculation hydraulic pump for recirculating the fluid pumped up from the reservoir between the any one of the hydraulic pressure generating device, the regulator, or the automatic hydraulic pressure generating device and the normal open type solenoid valves. It is preferable that to operate the recirculation hydraulic pump under the brake operation state when the air-containing detection means detects the air-containing in the hydraulic circuit.

Thus, with the hydraulic brake device including the anti-lock brake devices including the normal closed type solenoid valves, the air-containing detection means can detect the leakage of the fluid in case the fluid is leaked during the closed state of the normal closed type solenoid valves due to the valve failure. That is, when the normal closed type solenoid valves are failed to leak the fluid during the closed state of the normal closed type solenoid valves, the rise of the hydraulic pressure is delayed when increasing the pressure by compressing the fluid. When increasing the pressure of the fluid by the predetermined amount, the supply amount of the fluid which should be supplied from the outside is increased. This phenomenon is the same with the phenomenon caused when the air is included in the hydraulic circuit. Thus, the air-containing detection means in this case not only detects the air-containing in the hydraulic circuit but also detects the leak of the fluid from the normal closed type solenoid valves.

When the fluid is leaked from the normal closed type solenoid valve, the leaked fluid is accumulated in the reservoir. The leaked fluid is required to be recirculated to the hydraulic circuit accordingly. Thus, when the air-containing detection means detects the air-containing in the hydraulic circuit, that is when the air-containing detection means detects the leakage of the fluid from the normal closed type solenoid valves, the fluid in the reservoir is recirculated into the hydraulic circuit by actuating the recirculation hydraulic pump even under the state that the anti-lock brake devices are not operated under the brake operation state.

The principles, preferred embodiment and mode of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A hydraulic brake device comprising:
    a hydraulic pressure generating device for generating and outputting a hydraulic pressure in accordance with a brake operational amount;
    a wheel cylinder operated by the hydraulic pressure directly or indirectly supplied from the hydraulic pressure generating device for applying a braking force to a vehicle wheel;
    a brake operational amount detection means for detecting the brake operational amount;
    an output hydraulic pressure detection means for detecting an output hydraulic pressure outputted from the hydraulic pressure generating device;
    a hydraulic circuit for supplying the hydraulic pressure to the wheel cylinder; and
    an air-containing detection means for detecting air included in the hydraulic circuit by a response time relating to a rise of the output hydraulic pressure detected by the output hydraulic pressure detection means relative to a start of a rise of the brake operation amount detected by the brake operational amount detection means.

2. A hydraulic pressure device comprising:
    an accumulator for accumulating a hydraulic pressure;
    an auxiliary hydraulic source, the auxiliary hydraulic source having a hydraulic pump for supplying the hydraulic pressure to the accumulator and generating and outputting a high pressure within a predetermined range irrespective of a braking operation by intermittently actuating the hydraulic pump;
    a regulator for regulating the hydraulic pressure supplied from the auxiliary hydraulic source to output a regulated hydraulic pressure in accordance with a brake operational amount;
    a wheel cylinder operated by the hydraulic pressure directly or indirectly supplied from the regulator for applying a braking force to a wheel of a vehicle;
    an auxiliary hydraulic pressure detection means for detecting an auxiliary hydraulic pressure outputted from the auxiliary hydraulic source;
    an output hydraulic pressure detection means for detecting an output hydraulic pressure outputted from the regulator;
    a hydraulic circuit for supplying the hydraulic pressure to the wheel cylinder; and
    an air-containing detection means for detecting air included in the hydraulic circuit by a declining amount of the auxiliary hydraulic pressure detected by the auxiliary hydraulic pressure detection means relative to an increment of the output hydraulic pressure detected by the output hydraulic pressure detection means.

3. A hydraulic brake device comprising:
    an accumulator for accumulating a hydraulic pressure;
    an auxiliary hydraulic source having a hydraulic pump for supplying the hydraulic pressure to the accumulator for generating and outputting a high pressure within a predetermined range irrespective of a braking operation by intermittently actuating the hydraulic pump;
    a regulator for regulating the hydraulic pressure supplied from the auxiliary hydraulic source in accordance with a brake operational amount to output a regulated hydraulic pressure;
    a wheel cylinder operated by the hydraulic pressure directly or indirectly supplied from the regulator to apply a braking force to a wheel of a vehicle;
    a brake operational amount detection means for detecting the braking operational amount;
    an auxiliary hydraulic pressure detection means for detecting an auxiliary hydraulic pressure outputted from the auxiliary hydraulic source;
    a hydraulic circuit for supplying the hydraulic pressure to the wheel cylinder; and
    an air-containing detection means for detecting air included in the hydraulic circuit by a declining amount of the auxiliary hydraulic pressure detected by the auxiliary hydraulic pressure detection means relative to an increment of the braking operational amount detected by the braking operational amount detection means under a non operation state of the hydraulic pump.

4. A hydraulic brake device according to claim 1, wherein the braking operational amount detected by the braking operational amount detection means corresponds to a stroke amount of a braking operation member.

5. A hydraulic brake device according to claim 3, wherein the braking operational amount detected by the braking operational amount detection means corresponds to a stroke amount of a braking operation member.

6. A hydraulic brake device according to claim 1, wherein the braking operational amount detected by the braking operational amount detection means corresponds to an operational force of a braking operation member.

7. A hydraulic brake device according to claim 3, wherein the braking operational amount detected by the braking operational amount detection means corresponds to an operational force of a braking operation member.

8. A hydraulic brake device comprising:
    an automatic hydraulic pressure generating device having an auxiliary hydraulic source for outputting a predetermined high pressure irrespective of a braking operation for regulating a hydraulic pressure supplied from the auxiliary hydraulic source irrespective of the braking operation to output a regulated hydraulic pressure;
    a wheel cylinder operated by the hydraulic pressure directly or indirectly supplied from the automatic hydraulic pressure generating device for applying a braking force to a wheel of a vehicle;
    an output hydraulic pressure detection means for detecting an output hydraulic pressure outputted from the automatic hydraulic pressure generating device;
    a hydraulic circuit for supplying the hydraulic pressure to the wheel cylinder; and
    an air-containing detection means for detecting air included in the hydraulic circuit by a response time relating to a rise of the output hydraulic pressure detected by the output hydraulic pressure detection means relative to a start of an operation of the automatic hydraulic pressure generating device.

9. A hydraulic brake device comprising:
    an automatic hydraulic pressure generating device having an auxiliary hydraulic source for outputting a predetermined high pressure irrespective of a braking operation for regulating a hydraulic pressure supplied from the auxiliary hydraulic source irrespective of the braking operation to output a regulated hydraulic pressure;

a wheel cylinder operated by the hydraulic pressure directly or indirectly supplied from the automatic hydraulic pressure generating device for applying a braking force to a wheel of a vehicle;

an output hydraulic pressure detection means for detecting an output hydraulic pressure outputted from the automatic hydraulic pressure generating device;

a hydraulic circuit for supplying the hydraulic pressure to the wheel cylinder; and an air-containing detection means for detecting air included in the hydraulic circuit by an increment of the output hydraulic pressure detected by the output hydraulic pressure detection means after elapsing a predetermined time from starting an operation of the automatic hydraulic pressure generating device.

10. A hydraulic brake device comprising:

an automatic hydraulic pressure generating device, the automatic hydraulic pressure generating device having an accumulator for accumulating a hydraulic pressure, a hydraulic pump for supplying a hydraulic pressure to the accumulator, and an auxiliary hydraulic source for generating and outputting a high pressure within a predetermined range irrespective of a braking operation by intermittently actuating the hydraulic pump for regulating the hydraulic pressure supplied from the auxiliary hydraulic source irrespective of the braking operation to output a regulated hydraulic pressure;

a wheel cylinder operated by the hydraulic pressure directly or indirectly supplied from the automatic hydraulic pressure generating device for applying a braking force to a wheel of a vehicle;

an auxiliary hydraulic pressure detection means for detecting an auxiliary hydraulic pressure outputted from the auxiliary hydraulic source;

an outputted hydraulic pressure detection means for detecting an output hydraulic pressure outputted from the automatic hydraulic pressure generating device;

a hydraulic circuit for supplying the hydraulic pressure to the wheel cylinder; and an air-containing detection means for detecting air included in the hydraulic circuit by a declining of the auxiliary hydraulic pressure detected by the auxiliary hydraulic pressure detection means relative to an increment of the output hydraulic pressure detected by the output hydraulic pressure detection means after starting an operation of the automatic hydraulic pressure generating device under a non-operation state of the hydraulic pump.

11. A hydraulic brake device according to claim 8, further comprising:

a vehicle stopped state judging means for judging a stopped state of a vehicle; wherein the automatic hydraulic pressure generating device is operated while the vehicle stopped state judging means judges that the vehicle is under the stopped state for detecting the air included in the hydraulic circuit by the air-containing detection means.

12. A hydraulic brake device according to claim 9, further comprising:

a vehicle stopped state judging means for judging a stopped state of a vehicle; wherein the automatic hydraulic pressure generating device is operated while the vehicle stopped state judging means judges that the vehicle is under the stopped state for detecting the air included in the hydraulic circuit by the air-containing detection means.

13. A hydraulic brake device according to claim 10, further comprising:

a vehicle stopped state judging means for judging a stopped state of a vehicle; wherein the automatic hydraulic pressure generating device is operated while the vehicle stopped state judging means judges that the vehicle is under the stopped state for detecting the air included in the hydraulic circuit by the air-containing detection means.

14. A hydraulic brake device according to claim 8, further comprising:

a solenoid valve provided between the automatic hydraulic pressure generating device and the wheel cylinder; wherein the automatic hydraulic pressure generating device is operated under a state that the solenoid valve is closed under a non braking state for detecting the air included in the hydraulic circuit by the air-containing detection means.

15. A hydraulic brake device according to claim 9, further comprising:

a solenoid valve provided between the automatic hydraulic pressure generating device and the wheel cylinder; wherein the automatic hydraulic pressure generating device is operated under a state that the solenoid valve is closed under a non braking state for detecting the air included in the hydraulic circuit by the air-containing detection means.

16. A hydraulic brake device according to claim 10, further comprising:

a solenoid valve provided between the automatic hydraulic pressure generating device and the wheel cylinder; wherein the automatic hydraulic pressure generating device is operated under a state that the solenoid valve is closed under a non braking state for detecting the air included in the hydraulic circuit by the air-containing detection means.

17. A hydraulic brake device according to claim 1, further comprising a normal open type solenoid valve provided between the wheel cylinder and the hydraulic pressure generating device;

a normal closed type solenoid valve provided between the wheel cylinder and a reservoir;

a recirculation hydraulic pump for recirculating a fluid from the reservoir between the normal open type solenoid valve and the hydraulic pressure generating device; and an anti-lock brake device including the normal open type solenoid valve, the normal closed type solenoid valve, and the recirculation hydraulic pump; wherein the recirculation hydraulic pump is operated under a braking state when the air-containing detection means detects the air-containing in the hydraulic circuit.

18. A hydraulic brake device according to claim 2, further comprising a normal open type solenoid valve provided between the wheel cylinder and the regulator;

a normal closed type solenoid valve provided between the wheel cylinder and a reservoir;

a recirculation hydraulic pump for recirculating a fluid from the reservoir between the normal open type solenoid valve and the regulator; and an anti-lock brake device including the normal open type solenoid valve, the normal closed type solenoid valve, and the recirculation hydraulic pump; wherein
the recirculation hydraulic pump is operated under a braking state when the air-containing detection means detects the air-containing in the hydraulic circuit.

19. A hydraulic brake device according to claim 3, further comprising
a normal open type solenoid valve provided between the wheel cylinder and the regulator;

a normal closed type solenoid valve provided between the wheel cylinder and a reservoir;

a recirculation hydraulic pump for recirculating a fluid from the reservoir between the normal open type solenoid valve and the regulator; and an anti-lock brake device including the normal open type solenoid valve, the normal closed type solenoid valve, and the recirculation hydraulic pump; wherein
the recirculation hydraulic pump is operated under a braking state when the air-containing detection means detects the air-containing in the hydraulic circuit.

20. A hydraulic brake device according to claim 8, further comprising
a normal open type solenoid valve provided between the wheel cylinder and the automatic hydraulic pressure generating device;

a normal closed type solenoid valve provided between the wheel cylinder and a reservoir;

a recirculation hydraulic pump for recirculating a fluid from the reservoir between the normal open type solenoid valve and the automatic hydraulic pressure generating device; and an anti-lock brake device including the normal open type solenoid valve, the normal closed type solenoid valve, and the recirculation hydraulic pump; wherein
the recirculation hydraulic pump is operated under a braking state when the air-containing detection means detects the air-containing in the hydraulic circuit.

21. A hydraulic brake device according to claim 9, further comprising
a normal open type solenoid valve provided between the wheel cylinder and the automatic hydraulic pressure generating device;

a normal closed type solenoid valve provided between the wheel cylinder and a reservoir;

a recirculation hydraulic pump for recirculating a fluid from the reservoir between the normal open type solenoid valve and the automatic hydraulic pressure generating device; and an anti-lock brake device including the normal open type solenoid valve, the normal closed type solenoid valve, and the recirculation hydraulic pump; wherein
the recirculation hydraulic pump is operated under a braking state when the air-containing detection means detects the air-containing in the hydraulic circuit.

22. A hydraulic brake device according to claim 10, further comprising
a normal open type solenoid valve provided between the wheel cylinder and the automatic hydraulic pressure generating device;

a normal closed type solenoid valve provided between the wheel cylinder and a reservoir;

a recirculation hydraulic pump for recirculating a fluid from the reservoir between the normal open type solenoid valve and the automatic hydraulic pressure generating device; and an anti-lock brake device including the normal open type solenoid valve, the normal closed type solenoid valve, and the recirculation hydraulic pump; wherein
the recirculation hydraulic pump is operated under a braking state when the air-containing detection means detects the air-containing in the hydraulic circuit.

* * * * *